US007245748B2

(12) United States Patent
Degani et al.

(10) Patent No.: US 7,245,748 B2
(45) Date of Patent: *Jul. 17, 2007

(54) APPARATUS FOR MONITORING A SYSTEM WITH TIME IN SPACE AND METHOD FOR DIAGNOSING A CONDITION OF A PROSTATE

(75) Inventors: Hadassa Degani, Rehovot (IL); Edna Furman-Haran, Ness Ziona (IL)

(73) Assignee: Yeda Research and Development Co., Ltd., Rehovot (IL)

( * ) Notice: Subject to any disclaimer, the term of this patent is extended or adjusted under 35 U.S.C. 154(b) by 911 days.

This patent is subject to a terminal disclaimer.

(21) Appl. No.: 10/229,944

(22) Filed: Aug. 28, 2002

(65) Prior Publication Data
US 2003/0105605 A1 Jun. 5, 2003

Related U.S. Application Data

(60) Continuation-in-part of application No. 09/993,190, filed on Nov. 16, 2001, now Pat. No. 6,611,778, which is a division of application No. 09/101,708, filed as application No. PCT/US97/00801 on Jan. 21, 1997, now Pat. No. 6,353,803.

(51) Int. Cl.
*G06K 9/00* (2006.01)
*G01N 15/08* (2006.01)
*G01F 1/12* (2006.01)
*G01G 23/01* (2006.01)

(52) U.S. Cl. .................. 382/128; 702/12; 702/100; 702/102

(58) Field of Classification Search .................. 382/128
See application file for complete search history.

(56) References Cited

U.S. PATENT DOCUMENTS 6,353,803 B1 * 3/2002 Degani ...................... 702/100
6,611,778 B2 * 8/2003 Degani ...................... 702/104

OTHER PUBLICATIONS

Liney et al. "In Vivo magnetic resonance spectroscopy and dynamic contrast enhanced imaging of the prostate gland" NMR in Biomedicine. 1999, pp. 39-44.*

* cited by examiner

Primary Examiner—Matthew C. Bella
Assistant Examiner—Utpal Shah
(74) Attorney, Agent, or Firm—Martin Fleit; Paul D. Bianco; Fleit Kain Gibbons Gutman Bongini & Bianco, P.L.

(57) ABSTRACT

Apparatus and method for monitoring a prostate in a human body in which a fluid flows and which is characterized by a change in the prostate with time in space for the purpose of diagnosing a prostate condition, particularly cancer. A preselected place in the prostate is monitored to collect data at two or more time points correlated to a prostate event. The data is indicative of a prostate parameter that varies with time as a function of at least two variables related to prostate wash-in and wash-out behavior. A calibration map is made on a calculated basis with each pixel or voxel representative of a color hue indicative of wash-out behavior and a color intensity indicative of wash-in behavior. When a satisfactory map is obtained, the collected data is processed on the basis of the map to obtain an image of the preselected place with each spatial unit thereof correlated with a color hue and a color intensity. Software and a data processing system are provided to develop the calibration map. The calibration map and image of the preselected place are also novel implementations.

36 Claims, 22 Drawing Sheets

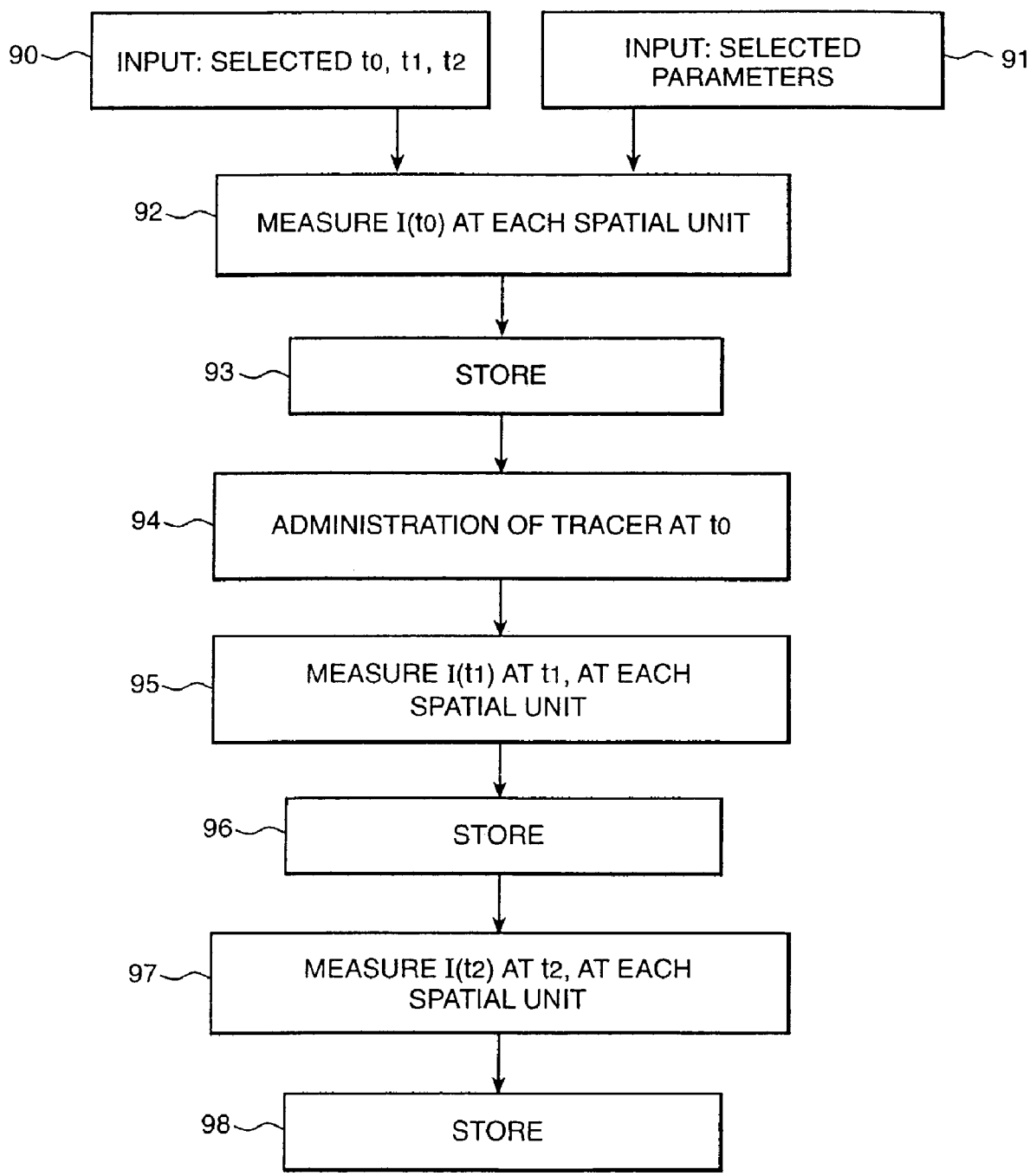

  
Pre contrast          30 s post contrast          6.5 min post contrast
FIG. 19

3TP
T₂-Weighted
Involvement of seminal vesicles
FIG.21

3TP
T$_2$-Weighted
FIG.22

APPARATUS FOR MONITORING A SYSTEM WITH TIME IN SPACE AND METHOD FOR DIAGNOSING A CONDITION OF A PROSTATE

This application is a Continuation-in-Part of U.S. application Ser. No. 09/993,190 filed Nov. 16, 2001, now U.S. Pat. No. 6,611,778 which is a divisional application of Ser. No. 09/101,708 filed Sep. 16, 1998, now U.S. Pat. No. 6,353,803 granted Mar. 5, 2002, which was a National Stage filing of PCT Application Number PCT/US97/00801 filed Jan. 21, 1997.

FIELD OF THE INVENTION

The present invention relates to apparatus for monitoring a system with time in space and method for diagnosing a condition of a prostate, especially cancer, and more particularly relates to an apparatus such as a unique MRI machine for diagnosing a condition of a prostate, especially cancer.

BACKGROUND OF THE INVENTION

Presently apparatuses are known for monitoring testing or measuring a system in which a fluid that is flowing or substances in the fluid will dissipate in part as it traverses the system or will require regeneration. For example, MRI machines are used today to create images with or without administration of a tracer-contrast agent. Customarily, the machine is controlled to take a series of images at discrete time intervals and the images are then dynamically analyzed to obtain an output result. For example, dynamic studies of contrast enhancement in breast tumors have demonstrated that the rate of change in signal intensity is an important parameter for the distinction of breast masses, leading to pharmacokinetic studies. However, it is known that as a result of tumor heterogeneity, there are significant local variations in the time evolution of contrast enhancement, and, therefore, maintaining high spatial resolution in both the recording and analysis steps is very important. In a standard clinical MRI of the breast, it is difficult to achieve high spatial resolution and also maintain high temporal resolution. In most dynamic studies performed previously, the emphasis was on high temporal resolution (at the expense of spatial resolution) monitoring the equilibration in the intravascular space and early diffusion into the extracellular space of the tissue. As a consequence, in standard MRI machines the output results are sometimes inconclusive.

Prostate cancer is the leading form of cancer diagnosed in males and the second leading cause of cancer-related death in men in the USA, as well as in many other Western countries. One out of every six men is at lifetime risk for prostate cancer. This high prevalence, and a rising age-adjusted mortality rate, makes prostate cancer a major socioeconomic problem. In 2001 alone, an estimated 198, 000 men in the United States were diagnosed with prostate cancer and 31,500 succumbed to it.

In the past, prostate cancer was only diagnosed when symptoms of advanced disease appeared. Currently, the best way to detect prostate cancer is to measure the level of the serum prostate specific antigen (PSA) in a blood test and to use a digital rectal examination (DRE) to feel for lumps on the prostate. Additional important tests used to diagnose prostate cancer include: (i) urine test for blood or infection; (ii) transrectal ultrasonography using a probe inserted into the rectum, which creates a picture based on the detection of the echoes of sound waves; (iii) intravenous pilogram of a series of X-ray pictures of the organ and the urinary tract; (iv) cytoscopy inspection of the urethra and the bladder via a thin lighted tube; and (v) biopsy—removing tissue, usually with a hollow needle, for pathologic examination.

Prostate specific antigen (PSA) is an enzyme produced by the epithelial cells of the prostate. Small amounts normally leak into the circulation with reported concentrations of less than 4 ng/ml. However, normal PSA levels may vary with age, for example, from 2.4 ng/ml for men aged 41-50 years to 6.5 ng/ml for men aged 71-80 years. Routine PSA tests are extremely valuable for monitoring for prostate cancer recurrence. A fall in PSA values indicates a favorable response to primary treatment. PSA is not cancer specific, and certain disorders and interventions such as benign prostatic hyperplasia, prostatitis, prostatic infraction, prostate surgery, and a prostate biopsy also elevate the PSA level. The reported sensitivity of the PSA test is 43-81%, and its specificity is 59-93%. Since 25% of men with PSA levels between 4-10 ng/ml have malignant disease, a biopsy is usually recommended for these patients. Of the 15 million men tested in 1998, 15% or 2.25 million men had PSA levels considered higher than normal and thus faced the prospect of biopsy. Because the lesion is difficult to visualize on transrectal ultrasound (TRUS), male prostate biopsies are performed "blindly", without regard to what may be localized areas. Sampling becomes a key issue in such situations, and over the last years there has been a shift from limited sampling (2 cores on each side), to increase sampling (3 cores on each side or 6 cores on each side and separate sampling of the seminal vesicles). Even with 13 cores, however, it is still possible to completely miss areas of carcinoma, and hence, understage the disease.

The introduction of the FDA-approved PSA serum test in 1987 was followed by a dramatic increase in the findings of new prostate cancers in the USA. Previously, when cancers were largely being diagnosed based on symptoms alone, the detection rate with DRE was only 1%, and 30% of patients had a clinically localized, potentially curable disease. In the PSA screening tests of men without symptoms, detection rates are as high as 5%, and 70%-98% of the patients have a potentially curable disease. The improvement in biopsy techniques with respect to technology and method of sampling the prostate has resulted in an improved early detection of smaller tumors.

Staging and grading of prostate cancer are vital for the management of the disease. Staging is a careful attempt to find out whether the cancer has spread and, if so, what parts of the body are affected. The results of staging are useful for selecting the appropriate therapy for the patient. The stages are characterized as follows. In stage I, the cancer cannot be detected by a rectal examination and causes no symptoms. Stage I tumors may be in more than one area of the prostate, but with no evidence of spread outside the prostate. In stage II, the tumor is felt by DRE or detected by the PSA test, but there is no evidence of spread outside the prostate. In stage III, the cancer has spread to nearby tissues, and in stage IV, to the lymph nodes or to other parts of the body.

Grading determines the pathologic nature of the cancer with reference to normal prostate tissue, primarily in relation to the state of aggressiveness and growth capacity of the cancer. The Gleason system is the predominant system used in describing prostate carcinoma grade. It is based on the assessment of two properties: differentiation and likelihood for the prostate cancer to spread, i.e., the tumor metastatic capacity.

Prediction of disease stage from preoperative information is possible, especially in the extremes. Several models were developed based on preoperative features such as: (i) PSA serum level (a PSA value between 4 and 10 ng/ml detects organ confined disease in 75% of cases, but this proportion decreases to 48% if the PSA value is greater than 10 ng/ml; a PSA value greater than 40 ng/ml is generally indicative of metastatic disease); (ii) the prostate gland volume as measured by ultrasound; (iii) the tumor volume as measured by DRE; (iv) the tumor length and volume on core biopsy; (v) biopsy sampling methods; (vi) PSA density; (vii) microvessel density; and (viii) histologic grade, as measured by the Gleason method.

The three most used method for the diagnosis of prostate cancer are computed tomography (CT), TRUS and MRI. All these methods have been evaluated as tools for staging prostate cancer. Of the three, MRI appears to have the greatest potential utility in providing diagnostic information, i.e. detection, staging and biopsy guidance. CT has reported accuracies ranging from 47%-75% for local staging of prostate cancer. Even though at the higher accuracies CT could compete with TRUS, it is generally not used for local staging of prostate cancer. Even though the accuracy of TRUS in staging prostate disease has been reported to be as high as 86% and as low as 38%, most reports indicate the TRUS is not as valuable as MRI in local staging. The major role of TRUS is in guiding needle biopsies. In addition, TRUS has been the modality of choice in determining prostatic volumes, even though there is some reader variability reported for these volume measurements.

The soft tissue contrast of MRI and the ability of MRI to acquire multi-planar images have increased its ability to evaluate the internal pelvic structures. T1-weighted images maximize the contrast between fat and solid organs or viscera and have been used to evaluate lymphadenopathy. T2-weighted images characterize the internal structure of solid organs and provide a high contrast between tumor and normal muscular tissue. However, this distinction is often lost in the prostate and depends on the location of the pathologic changes within the prostate. Due to similarities between tumor and central gland tissues, poor discrimination results, particularly in the presence of coexisting benign disease. No significant improvement in the detection of extra-capsular extension was reported when fat-suppressed T2-weighted images were applied.

Pelvic MRI based on relaxation weighted imaging did not show a marked improvement in prostate cancer staging. As a result of this low accuracy, investigators have turned to use endorectal MRI coils in order to increase the sensitivity and specificity of MR imaging. The staging accuracy for endorectal coil MRI in preliminary studies varied between 68% and 82%. Staging of local disease was considerably poorer at 57%. The utility of endorectal imaging for prostate cancer has not been universally accepted. Yet, multivariable analysis has shown that endorectal MRI findings of extra-capsular extension is the single most significant predictor of pathology at radical prostatectomy when compared with clinical staging, serum PSA level, or the Gleason score on biopsy. Most researchers believe that endorectal imaging may be especially useful for the determination of seminal vesicle involvement, though extra-capsular extension can often be detected as well.

The use of contrast-enhanced MRI to diagnose prostate diseases has so far been limited. Recently, the ability of dynamic contrast-enhanced MRI to differentiate benign from malignant prostatic disease has been evaluated (Liney G P, Turnbull L W and Knowles, 1999, In vivo magnetic resonance spectroscopy and dynamic contrast enhanced imaging of the prostate gland, *NMR in Biomedicine*, 12, pp. 39-44; Turnbull L W et al., 1999, JMRI 9, pp. 311-316). The first study included 20 patients, and the second 13 patients who were candidates for radical prostatectomy based on transrectal ultrasound findings and negative radioisotope bone scans. Maps at pixel resolution of the maximum enhancement factor value and of the time taken to reach maximum enhancement were calculated. Significant contrast-uptake was observed with faster enhancement in tumor regions than in benign prostatic hypertrophy (BPH) regions. Considerable discrimination between the different regions was obtained, emphasizing the potential of contrast enhanced MRI in staging prostate cancer patients. In both studies, high temporal resolution (11 sec.) and low spatial resolution (6-7 mm slice thickness) were applied. It was indicated that the low spatial resolution in these studies is a serious limiting factor, especially when dealing with heterogeneous lesions.

Accepted standard treatments for prostate cancer include careful observation, surgery (radical prostatectomy, transurethral resection of the prostate), radiotherapy and hormone therapy. Many men, mostly elderly, whose prostate cancer is progressing slowly and is detected at an early stage, may not need treatment and undergo careful observation. For these patients, the possible risk and side-effects of surgery and treatment may outweigh the possible benefits of treatment. The decision as to who will benefit from a prostatectomy is a major issue. Clearly, some of these men die before their prostate carcinoma causes significant problems and such tumors have been described as "insignificant." Others undergo a radical prostatectomy only to discover that their tumors have grown beyond the prostate, and 50% of these men will suffer a recurrence. Finally, there are patients who will most likely benefit from radical prostatectomy.

The staging and prognosis of patients at the lower and upper ends of the Gleason score spectrum are more readily predicted. However, most patients today are found initially with these parameters in an intermediate range. Additional information about disease extent is needed for early and accurate staging and treatment, as well as to determine a better means to follow patient progress.

Currently, however, there is no precise clinical method for the reliable assessment of local extent of prostate cancer. This is a major drawback in the treatment of localized disease.

SUMMARY OF THE INVENTION

Accordingly, the object of the present invention is to provide an apparatus or a machine, and a correlated method, for monitoring a system, namely a human body, in which a fluid is flowing, and which is characterized by a change in the system with time in space, for determining a prostate condition for diagnosing cancer.

In the parent application noted hereinabove, the invention disclosed relates to an apparatus for monitoring a system with time in space. The system can be physical, chemical, biological, physiological, environmental, clinical or any other system in part or in whole, with the system evolving with time over space in a certain way. The apparatus described in said parent application can function on the basis of one, two, three or higher dimensions. The type and extent of spatial resolution and the number of time points and their spacing, that the apparatus selects, depend on the system and can be varied with a lower limit for the number of time points of two. For example, it can be used for processing time dependent data of radiologic examinations such as MRI, ultrasonography, X-ray tomography or conventional X-ray, or nuclear medicine for obtaining diagnosis, prognosis and therapy follow up of tumors or any other pathological disorders. It can be utilized for processing monitoring or controlling environmental data of water irrigation. It can be used to analyze data that will permit determination of leafing areas in pipes. It can be used to analyze data obtained in the food, cosmetic and other industries which involve mixture and solution preparations and determination of their homogeneity. It can be also used to assess the efficiency of heating and/or cooling systems.

There are numerous phenomena that evolve over space with time in a way that can be treated according to the invention described in the parent application by utilizing a novel approach which is termed there and herein as wash-in and wash-out behavior. The wash-in and wash-out are terms that are used symbolically to describe a change in one direction (wash-in) and the reverse change (wash-out) which may not be true reversal but can be any pathway that induces a change. Specifically, flow of fluid in a system where the fluid or fluid component dissipates or needs to be regenerated, is described as wash-in and wash-out.

For any wash-in/wash-out situation, it is possible to describe n number of patterns of wash-out, when n can range from 1 to any integral number 2, 3, 4 etc., on the basis of m time points, when m can range from 2 to any integral number of specific time points in the time evolution of the process. The definition of wash-out is not strict and a wash-in can become a wash-out and vice versa.

For each kind of system, the apparatus of the parent application provides for monitoring, controlling or regulating the system by providing for setting time points and other optimal parameters of the system. This setting uses a novel calibration map based on a physical model which describes the evolution with time in an approximate or rigorous manner. These calibration maps serve also to interpret quantitatively the final color hue/color intensity coded maps obtained as one of the products of the apparatus.

One particular use of the apparatus of the parent application is for contrast-enhanced MRI data in order to obtain products that facilitate specific diagnosis of cancer. The time of start of contrast administration is time point t0 and then two post contrast time points t1 and t2 are utilized. These post contrast times are selected by constructing calibration maps based on modelling the kinetics of contrast enhancement that relates the wash-in/wash-out rates to two pathophysiological parameters: microvascular permeability times surface area (termed in short, microvascular permeability and represented by the letter K) and fraction of extracellular volume represented by v. The calibration map is constructed by the apparatus.

It has now been discovered that the above method, designated by the inventors as 3TP method, as well as the apparatus, can be adapted to the diagnosis of a prostate condition.

The principles of the 3TP method are general and can be applied to monitor prostate cancer patients as well as other diseases that demonstrate contrast changes following contrast agent administration. Blood vessel density in prostate cancer is an independent indicator of pathological state and prognosis. With the addition of vessel permeability by the 3TP method, which reflects high angiogenic activity, this parameter may be even more reliable as a prognostic factor. The color distribution in the 3TP images also enables characterizing tumor cellularity (the density of the cells in the tumor) and hence the differentiation of the lesion with high cellularity. The reduced fluid content of well to moderately well differentiated tumors can be further used to improve the specificity of tumor staging.

By enhancing the in-plane resolution and performing a pixel-by-pixel model-based analysis, the 3TP method can be optimized to improve tissue characterization and staging accuracy of prostate MRI. It is expected that tumor volume will be also assessed more accurately. A high percentage of red bright areas in the 3TP images of cancers may indicate a worse prognosis than for those with a low percent. The exact correlation between the color hue and color intensity for assessment of prognosis can be obtained by a clinical trial. In summary, contrast-enhanced MRI with the 3TP method for the dynamic data analysis can provide useful staging information. The technique may be performed together with conventional T2-weighted images within a clinically acceptable examination time.

The major areas of prostate cancer that can markedly benefit from the application of the 3TP method are: diagnosis of PSA-positive patients, staging/grading of prostate cancer, follow-up of radiotherapy-treated patients, and follow-up of post-radical prostatectomy patients to predict prostate cancer recurrence. The threshold and criteria for the different modalities will be determined by a multi-site clinical trial using the apparatus, software and method of the present invention.

BRIEF DESCRIPTION OF THE FIGURES

FIG. 6 is a block diagram of the apparatus of FIG. 1 showing in detail the control and effect means of the apparatus for controlling and effecting data collection on a system;

FIG. 19 are dynamic contrast-enhanced MR images of a prostate cancer patient;

FIG. 21 shows analysis of contrast-enhanced MR images of another prostate cancer patient;

FIG. 22 shows analysis of contrast-enhanced MR images of a further prostate cancer patient.

DETAILED DESCRIPTION OF THE INVENTION

Figure 1:
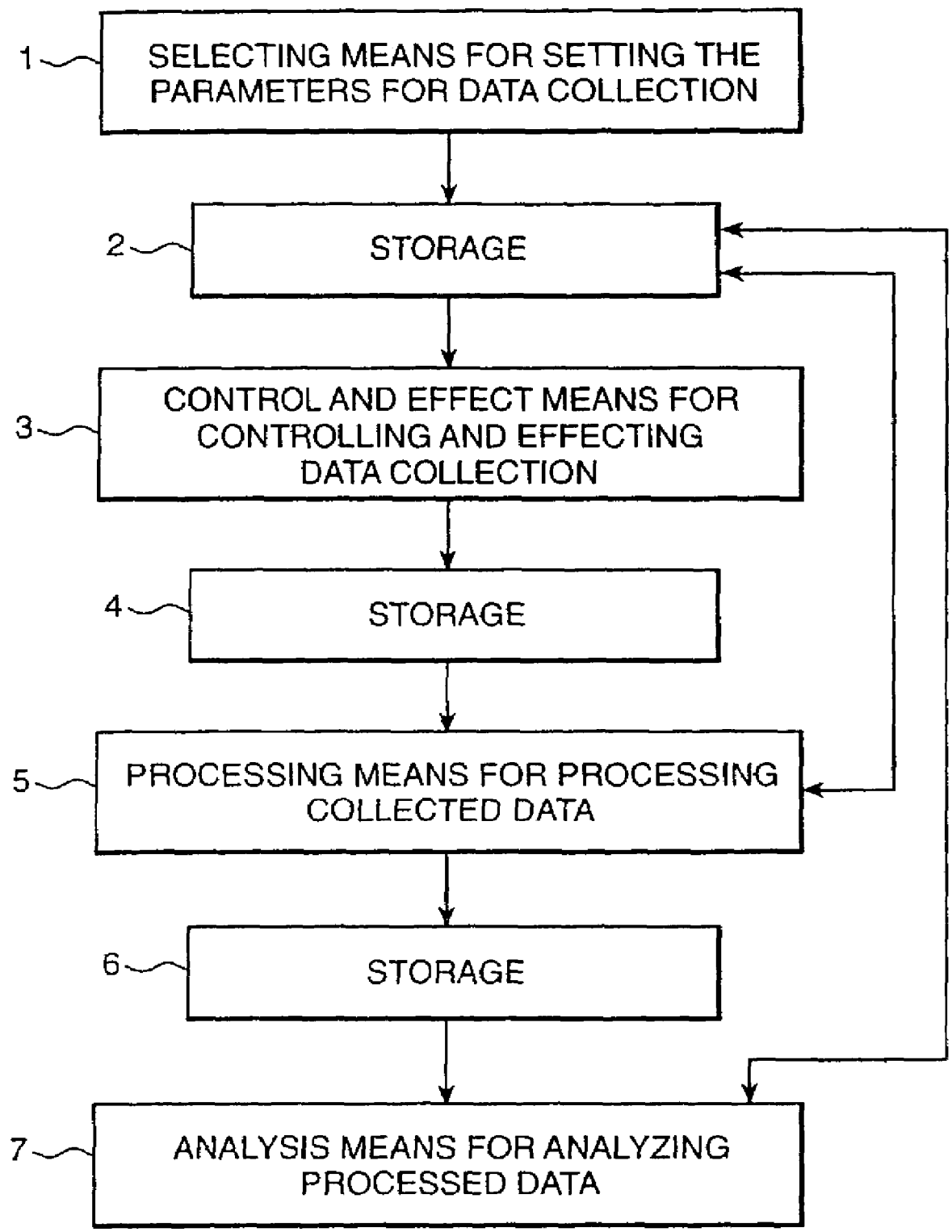
FIG. 1 is a block diagram of the apparatus of the invention for monitoring a system with time in space.

Referring now to FIG. 1, there is shown a block diagram of an apparatus for monitoring a system with time in space which embodies the invention. This apparatus includes selecting means (1) for setting the time points for data collection, and for setting the parameters of the portions of the apparatus used for data collection, and for processing a colorized calibration map for analysis of processed data that relates variables of the system to unique wash-out/wash-in behaviors which use color hue and color intensity for coding these behaviors. The selecting means is linked to a storage means (2) for storage of the selected times, parameters and calibration map. The storage means (2) is linked to a control and effect means (3) for controlling the time and parameters of data collection determined by the selecting means (1) and for effecting the data collection. The means for effecting the data collection (3) are known in the art for which the apparatus will be used.

The control and effect means (3) is linked to a storage means (4) for storing the data collected with time in space. The storage means (4) is linked to a processing means (5) for processing the stored collected data according to a novel unique wash-out/wash-in scheme which uses color hue and color intensity and which is programmed into the processing means (5). The processing means (5) is also linked to storage (2) to receive as part of its input parameters and values set in (1). The processing means (5) is linked to a storage means (6) for storing the processed data. The storage (6) is linked to analysis means (7) for analyzing the processed data. This means (7) is also linked to storage (2) for analyzing the processed data on the basis of the stored calibration map.

All the means can operate sequentially using all storage means, part of the storage means or none. Instead of a storage means (2), (4) and/or (6), a direct output to input link between blocks (1) to (3), blocks (3) to (5) and/or blocks (5) to (7), respectively, can exist. The portions of the apparatus need not function all at the same time nor at the same location.

Figure 2:
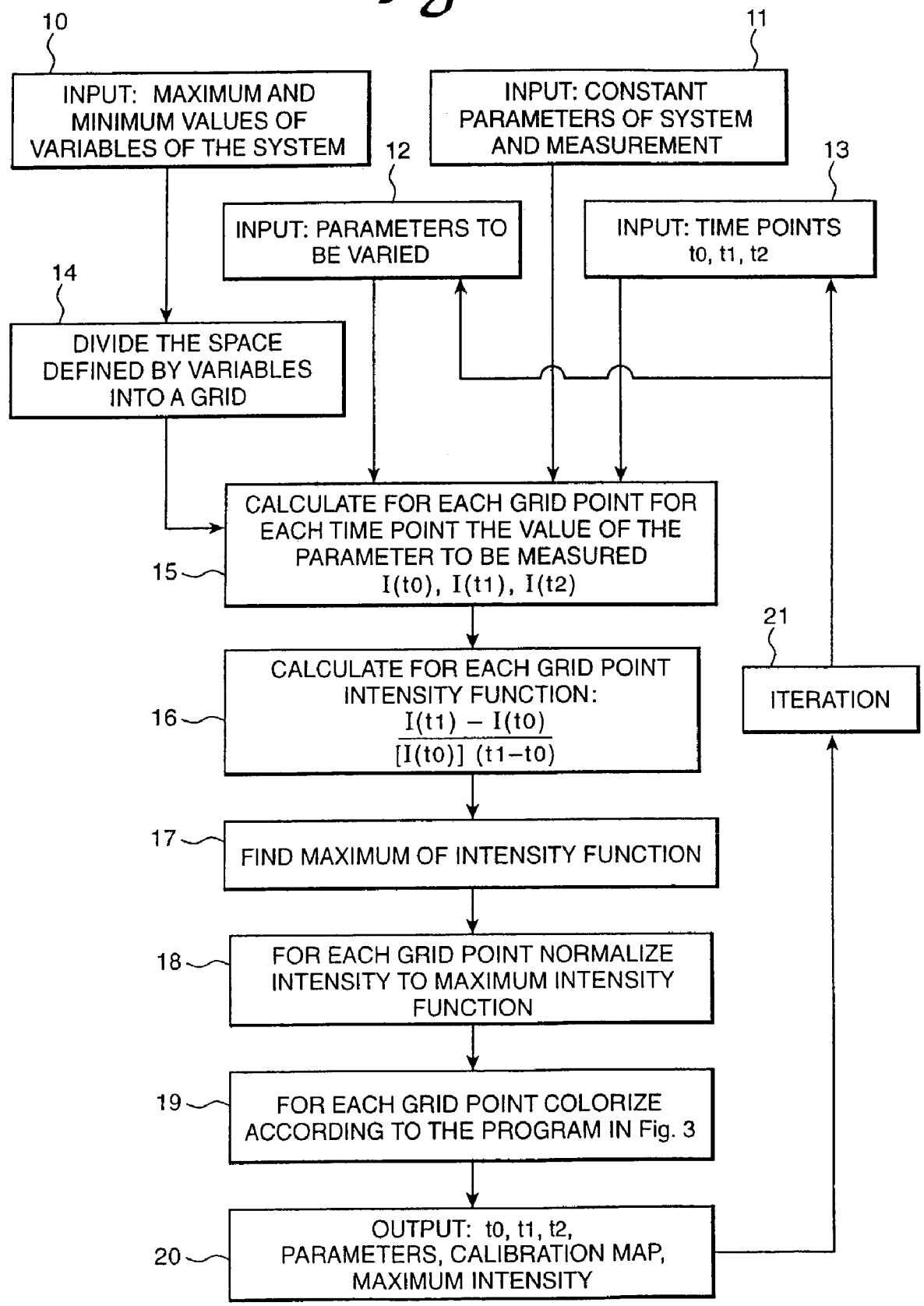
FIG. 2 is a block diagram of the details of the selecting means of the apparatus in FIG. 1 for setting the parameters for data collection.

Referring now to FIG. 2, there is shown a more detailed block diagram of the selected means, shown in block (1) of FIG. 1. The function of the selecting means is to select time points for data collection, parameters of data collection and for producing a novel calibration map that relates wash-out/wash-in characteristics coded in color hue/color intensity to variables of the specific system being monitored.

The inputs of the program are blocks (10), (11), (12) and (13) and include the maximum and minimum values for variables of the system being monitored (block 10), input of constant parameters used for data collection (block 11), parameters used for data collection that can be varied (block 12) and three time points, namely t0, t1 and t2, selected initially as an intuitive guess from general knowledge of the system as the starting point of an iterative procedure (block 13). The input of block (10) enables the apparatus to divide the system space defined by the variables into a grid, in block (14). For one variable, each grid point is a unit length. For two variables, each grid point defines a pixel, for three variables each grid point defines a volume (voxel). The grid developed in block (14) and the inputs of blocks (11), (12) and (13) serve to determine in block (15), for each grid point, a value for the parameter to be measured at preselected times, t0, t1 and t2, termed I(t0), I(t1) and I(t2), respectively. This determination or calculation uses an equation specific to the particular system being monitored that can estimate exactly or approximately the change with time in the value of the parameter to be measured for each set of variables of the system. Such equations are well known to those skilled in the art for particular systems. The values of I(t0) and I(t1) calculated in block (15) are used to determine or calculate in block (16), for each grid point, an intensity function according to the equation $$\frac{I(t1) - I(t0)}{[I(t0)](t1 - t0)}$$

Figure 3:
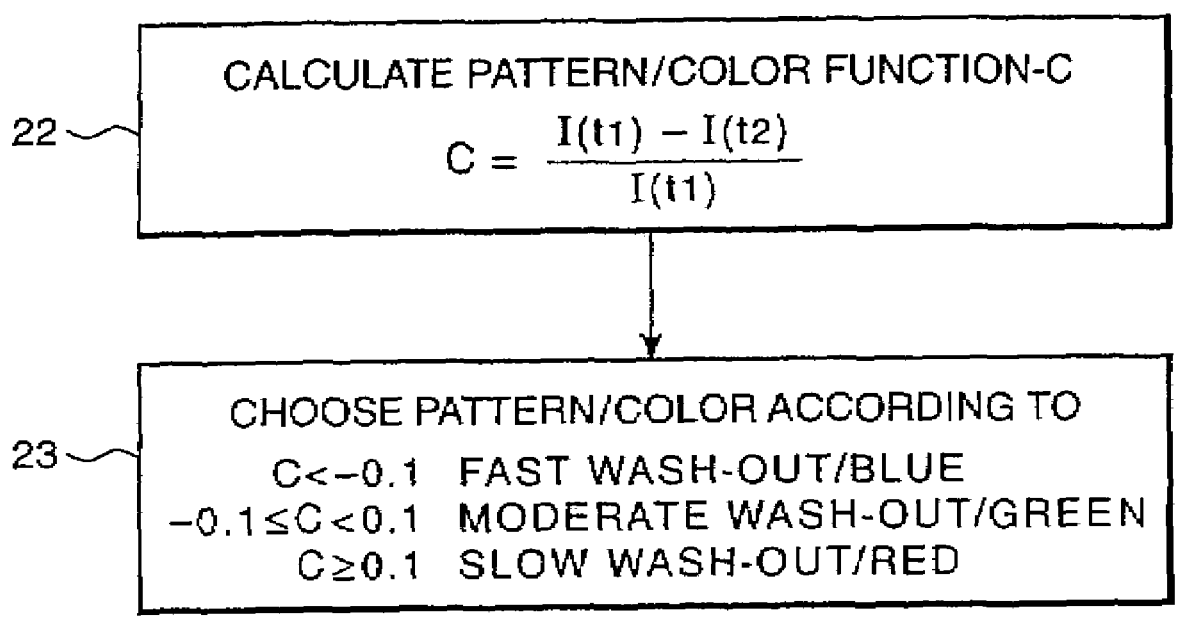
FIG. 3 is a block diagram of the details showing the colorize function C of the selecting means of the apparatus of FIG. 1.

This intensity function represents a wash-in characteristic of initial-rate of wash-in. Then in block (17), by a conventional loop, the grid point with a maximum intensity function is determined and is then outputted to block (18) as maximum intensity. In block (18), all other intensity functions in the remaining grid points are normalized in reference to the maximum intensity. Next, the apparatus in block (19) colorizes each grid point according to the program shown in FIG. 3. Referring to FIG. 3, function C, which determines the pattern of wash-out/color hue, is calculated or determined in blocks (22) and (23) in terms of I(t1) and I(t2), for each grid point, and a wash-out pattern/color hue is chosen according to:

$$C = \frac{I(t1) - I(t2)}{I(t1)}$$

Figure 13:
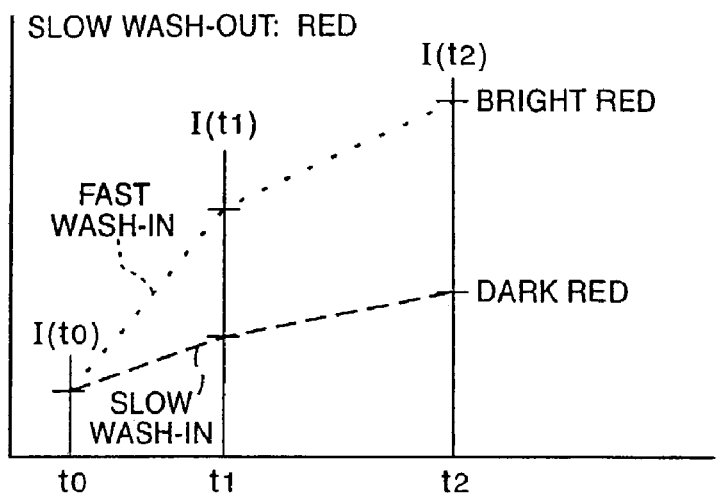
FIG. 13 is a graph showing the pattern of slow wash-out/slow wash-in and slow wash-out/fast wash-in for the three time points t0, t1 and t2 and with data values I(t0), I(t1), I(t2)
Figure 14:
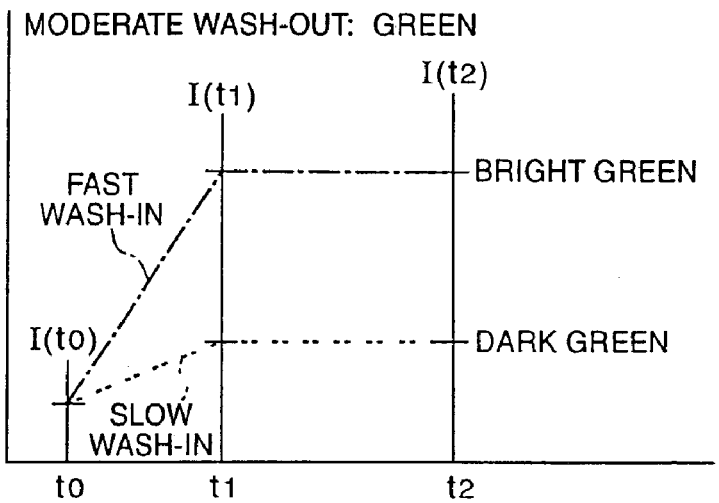
FIG. 14 is a graph showing the pattern of moderate wash-out/slow wash-in and of moderate wash-out/fast wash-in for the three time points t0, t1 and t2 and with data values I(t0), I(t1), I(t2)
Figure 15:
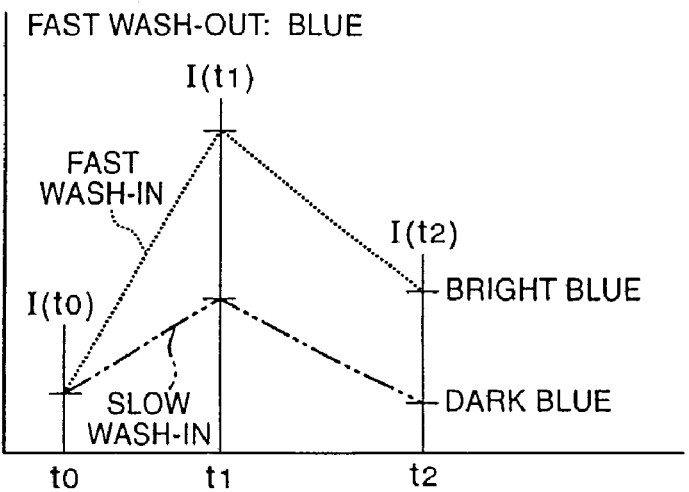
FIG. 15 is a graph showing the pattern of fast wash-out/slow wash-in and of fast wash-out/fast wash-in for the three time points t0, t1 and t2 and with data values I(t0), I(t1), I(t2)

FIGS. 13, 14 and 15 describe systematically the principles of choosing a wash-out pattern which is coded in color hue and of choosing wash-in initial rate (apparent initial rate) coded in color intensity. The first pattern (FIG. 13) is the slow wash-out pattern defined by I(t1)<I(t2) and is determined by:

$$\frac{I(t2)-I(t1)}{I(t1)} \geq 0.1$$

This pattern is for example coded with the color red. If the intensity function, $$IntensityFunction = \frac{I(t1)-I(t0)}{[I(t0)](t1-t0)}$$

which is a measure of the apparent initial rate of wash-in has a high value for a slow wash-out pattern, then the red color will be bright reflecting fast wash-in (FIG. 13). If the intensity function has a low value for a slow wash-out pattern, then the red color will be dark reflecting slow wash-in (FIG. 13).

The second pattern is the moderate wash-out pattern (FIG. 14) defined by $I(t1) \approx I(t2)$ and is determined by $$-0.1 < \frac{I(t2)-I(t1)}{I(t1)} < 0.1$$

This pattern is, for example, coded with the color green. As in the red case, if the intensity function has a high value for this moderate pattern, then the green color will be bright (FIG. 14). If, however, the intensity function has a low value, the green color will be dark (FIG. 14).

The third pattern (FIG. 15) is the fast wash-out pattern defined by $I(t1) > I(t2)$ and is determined by $$\frac{I(t2)-I(t1)}{I(t1)} \leq -0.1$$

and coded, for example, blue. Again, if the intensity function is high, namely, wash-in apparent initial rate is fast, the color blue will be bright (FIG. 15). If, however, the intensity function is low, the color blue will be dark (FIG. 15). Thus, for each pattern of wash-out coded by a color hue, there can be defined a wash-in rate which relates to the intensity function which determines color intensity. The separation between different wash-in rates depends on the range of color intensities chosen.

Referring again to FIG. 2, in block (20), the apparatus, in the final output for the selected t0, t1 and t2 and for the selected system parameters, assigns to each grid point that defines values of the variables of the system, a color hue and a color intensity. The colorized and intensity normalized grid points collectively are termed a "calibration map". If the composite calibration map for the selected t0, t1, t2 and for the selected system parameters is satisfactory, as will be explained in detail hereafter, the program ends and sends the output to storage in block (2) of FIG. 1 or directly to block (3) of FIG. 1, in case block (2) is not utilized, as explained hereinbefore. If the calibration map is not satisfactory, the apparatus makes an appropriate adjustment of the three time points, for example, by incrementing t1 and t2 and inputs them into block (13). Alternatively, the apparatus can incre ment new values for parameters of the system and/or of the measurement, as preselected, and input into block (12). Also, both time points and these parameters can be changed. The steps in the program are repeated using the original inputs of blocks (10) and (11) and going from blocks (14) to (20). This iteration (block 21 in FIG. 2) can be repeated until a satisfactory calibration map is obtained for a set of preselected times and parameters.

In the definition of the intensity function in block (16) (FIG. 2) and the definition of the pattern of wash-out/color hue function C in blocks (22) and (23) (FIG. 3), it is assumed that $I(t1) > I(t0)$. In cases where $I(t1)$ is negative, but the absolute value of $/I(t1)/$ is higher than $I(t0)$, the definitions hold for the absolute values. The choices for coloring function C in block (23) (FIG. 3) are not limited to the specific examples of $C < -0.1, -0.1 \leq C < 0.1$ and $C \geq 0.1$, corresponding to fast wash-out, moderate wash-out and slow wash-out, respectively, but any other fraction (such as 0.05 or 0.2) can be used to define C depending on the system.

Figure 4A:
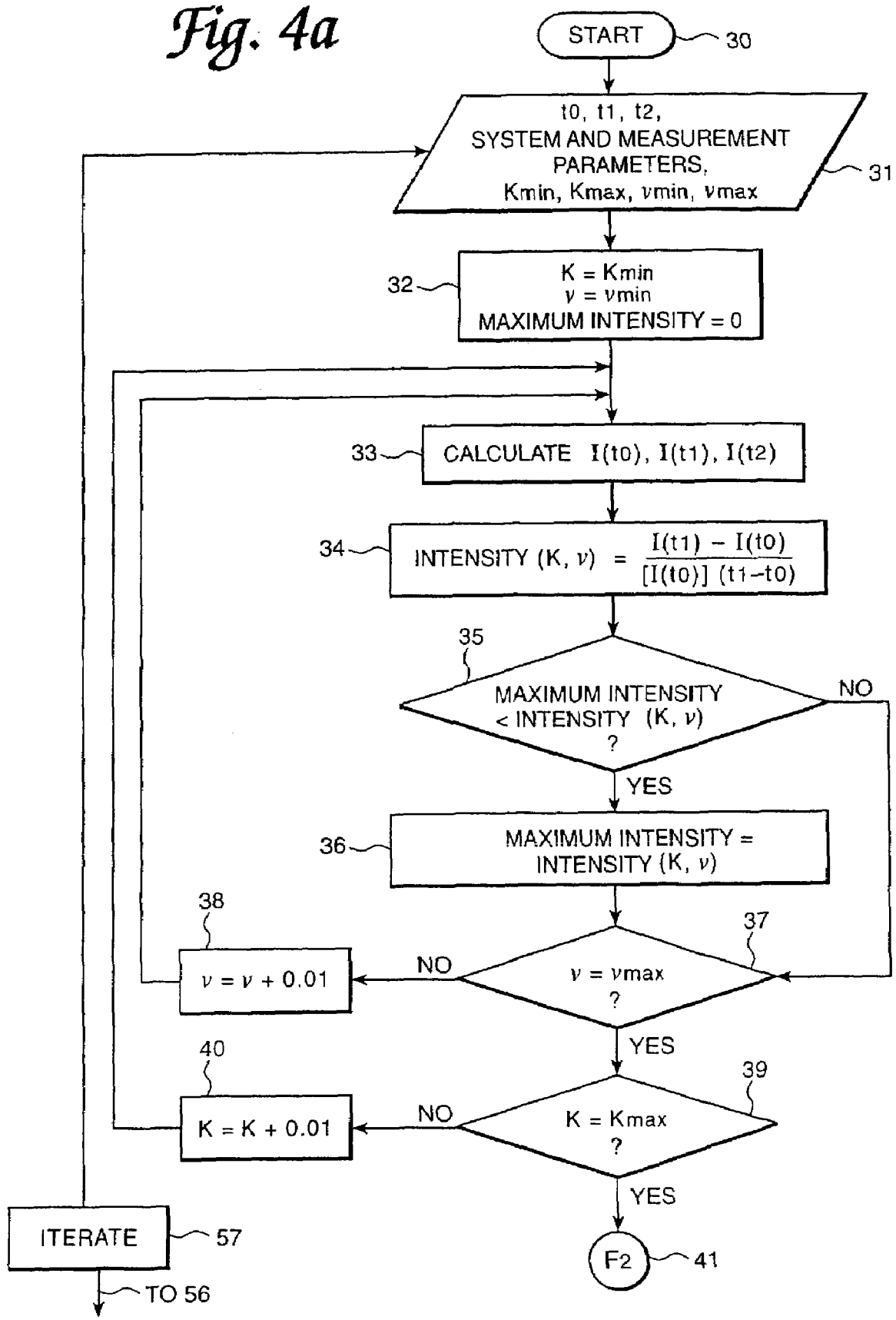
FIGS. 4a-4b are a flow diagram of the selecting means of the apparatus of FIG. 1 illustrating the setting of the parameters for data collection.
Figure 4B:
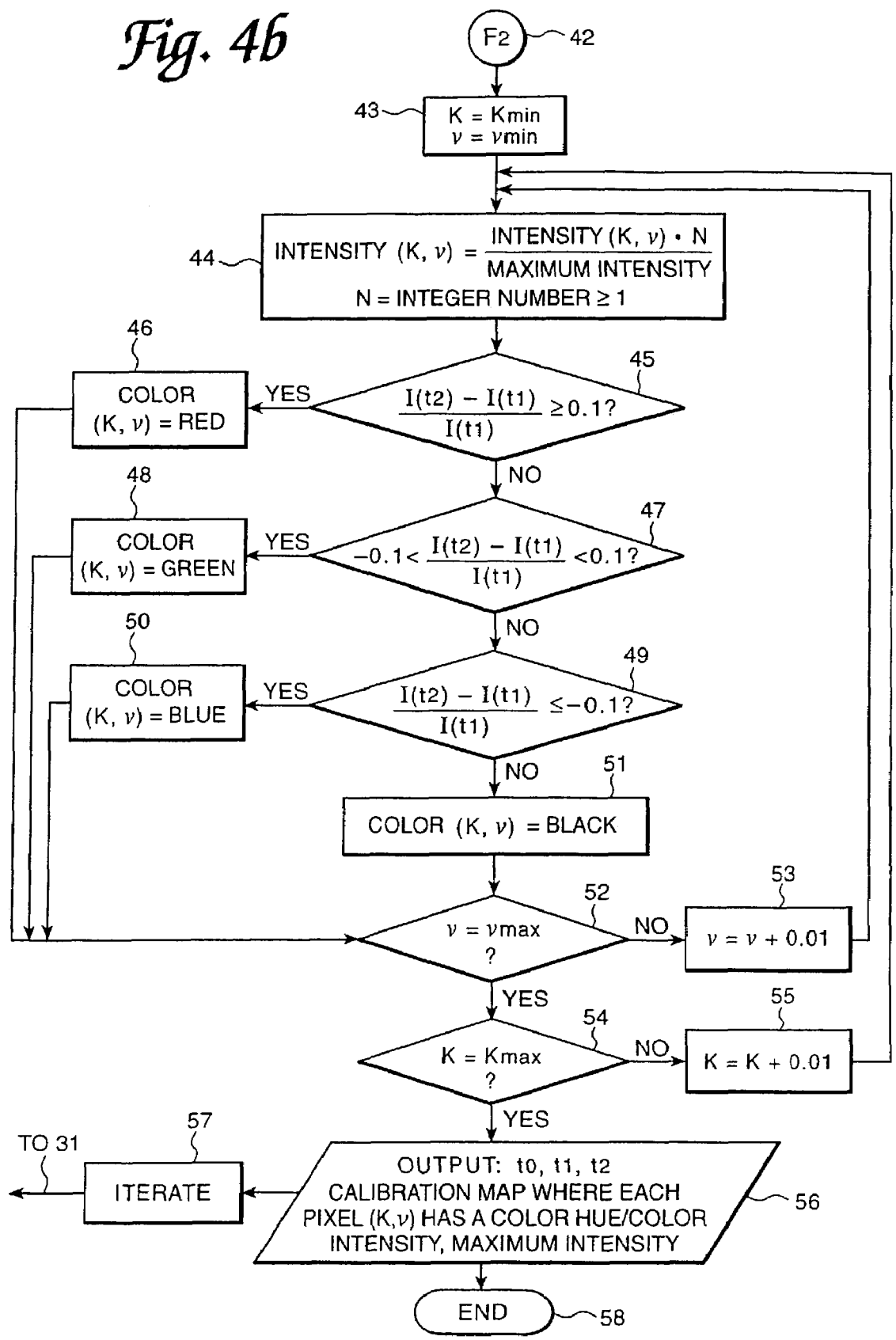

Referring now to FIGS. 4a-4b, there is shown a flow diagram (steps or blocks) for setting the parameters for data collection and creating a calibration map. This flow diagram is written for a monitored parameter that varies with time as a function of two variables of the system assigned here with the letters K and v. For each grid point in a 2-dimensional grid of K and v, a pixel of dimension of 0.01 units of K and 0.01 units of v is defined in steps or blocks (38) and (40) of FIG. 4a and (53) and (55) of FIG. 4b. The program starts in block (30) and gets inputs of the time points, t0, t1 and t2, system and measurement parameters and the range of K and the range of v between their minimum and maximum values in block (31). The program starts from pixel (K min, v min) in block (32) to calculate I(t0), I(t1), I(t2) in block (33) using an approximate or exact equation correlated to the system being monitored, as is known, that estimates how the parameter monitored with time I(t) depends on K and v, and on other system parameters. The determined or calculated I(t1) and I(t0) are used to calculate for each pixel Intensity (K, v) as shown in block (34), which represent wash-in initial rate. The program is then searching whether the pixel has maximum intensity (blocks 35 to 40) and proceeds through all the pixels in a loop mode returning to block (33) and going again through step (34) to block (40) until it reaches the pixel with maximum K and maximum v. Through this loop, the pixel with maximum intensity is identified and intensity is calculated for all pixels (K, v). Now, as depicted in FIG. 4b, the program proceeds to calculate for each pixel starting from pixel (K min, v min) block (43) a normalized intensity, block (44), normalized relative to the maximum intensity. The pixel with maximum intensity is assigned with a maximum value for intensity N. N can be 1, 2, 3 or any number such as 8, 64, 256 (computer numbers), etc. depending on the demands of the system. Then, the program calculates the wash-out pattern for each pixel starting from pixel (K min, v min) until it reaches pixel (K max, v max) and codes with color hue each pattern as shown in blocks (45) to (54). Now, all pixels have a color hue and a normalized color intensity. This produces in the output a calibration map of K, v in block (56) for the selected t0, t1, t2 and system and measurement parameters. If the calibration map is not satisfactory e.g. excessively slanted toward one color hue, then new time points, or new system or measurement parameter values, or all are adjusted in direction to correct the calibration map and bring it to a more satisfactory balance from a color distribution standpoint. The program in block (57) goes through all the steps in the flow diagram, again, using the new inputs until a satisfactory calibration map is obtained (end-58), which sets the selected time points and system parameters. What will be a satisfactory calibration map depends on the system and will be apparent to one skilled in the art. For most systems a satisfactory map will have about a third of the pixels red, a third green and a third blue.

Figure 5A:
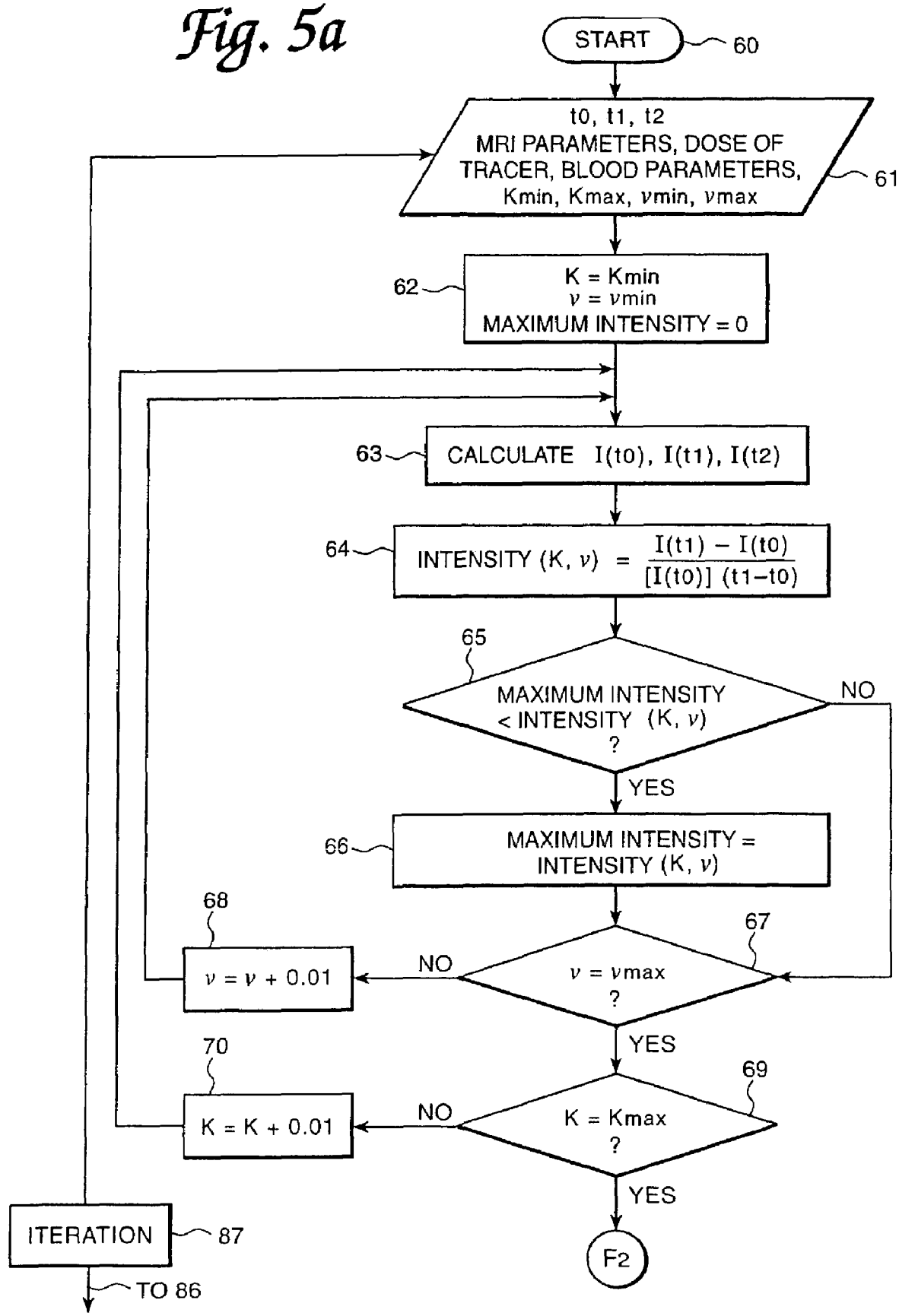
FIGS. 5a-5b are a flow diagram of the selecting means showing the novel apparatus selecting means used as a novel MRI apparatus for collection of MRI images.
Figure 5B:
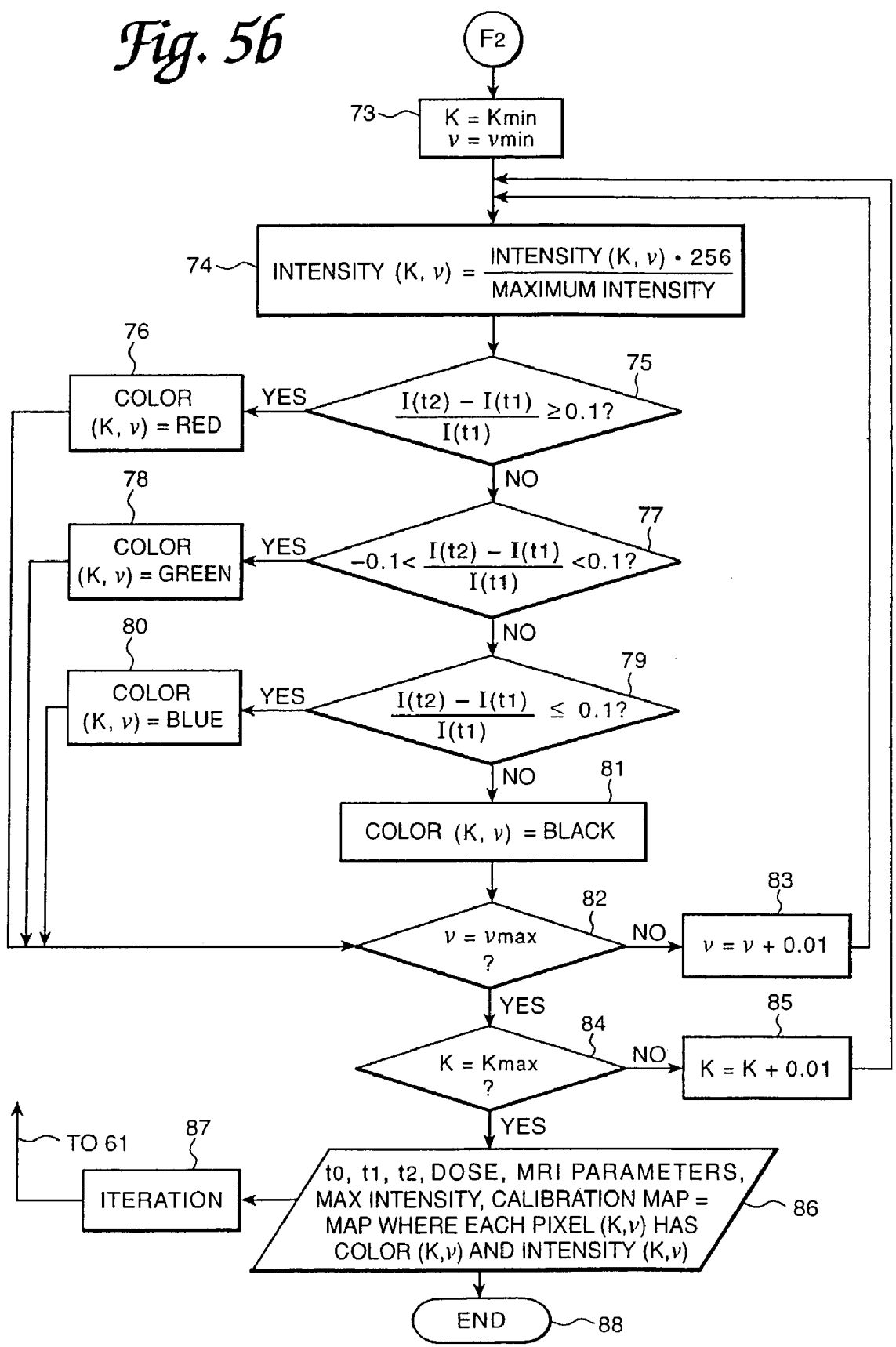

A specific example of a flow diagram for setting the parameters for tracer modulated MRI, termed also contrast enhanced MRI, is shown in FIGS. 5*a*-5*b*. The MRI signal is the monitored parameter that is changing with time as a result of administering a tracer, termed also contrast agent. The input parameter in step (61) of FIG. 5*a* includes the three time points t0, t1 and t2. These time points are obtained initially by experience in step (87) and are subjected to an iterative process until the best three time points are obtained. Other inputs are the tracer-dose and the MRI parameters that define how the MRI signal is recorded. Both the tracer dose and MRI parameters can be constant, or can be optimized by the iterative process in step (87). The input also includes pharmacokinetic parameters that define the tracer change with time in the blood, and maximum and minimum values for the two variables K and v that define pathophysiological characteristics of the system, namely, a subject body. The variable K defines microvascular permeability which estimates the capacity of blood vessels to leak out the tracer. The variable v defines the fraction of extracellular volume which estimates the amount of free space in a tissue. The steps (62) of FIG. 5*a* to (85) of FIG. 5*b* follow the steps (32)-(54) in FIGS. 4*a*-4*b*. In the flow diagrams of FIGS. 5*a*-5*b*, the maximum intensity is assigned in step (74) to have the value of 256. The output in step (86) consists of a calibration map of the two variables K and v ranging between K min, v min to K max, v max for a specific set of time points and the other inputs. Each pixel in this map with specific K, v values has a color hue and a color intensity. A satisfactory calibration map is defined by reaching a certain distribution of the colors or of the colors and color intensities. For example, a satisfactory map can be one that divides the K-v plan or plane, or volume between the three colors to approximately three equal areas, namely, approximately a third of the pixels in the calibration map are red, a third are green and a third are blue.

Figure 16:
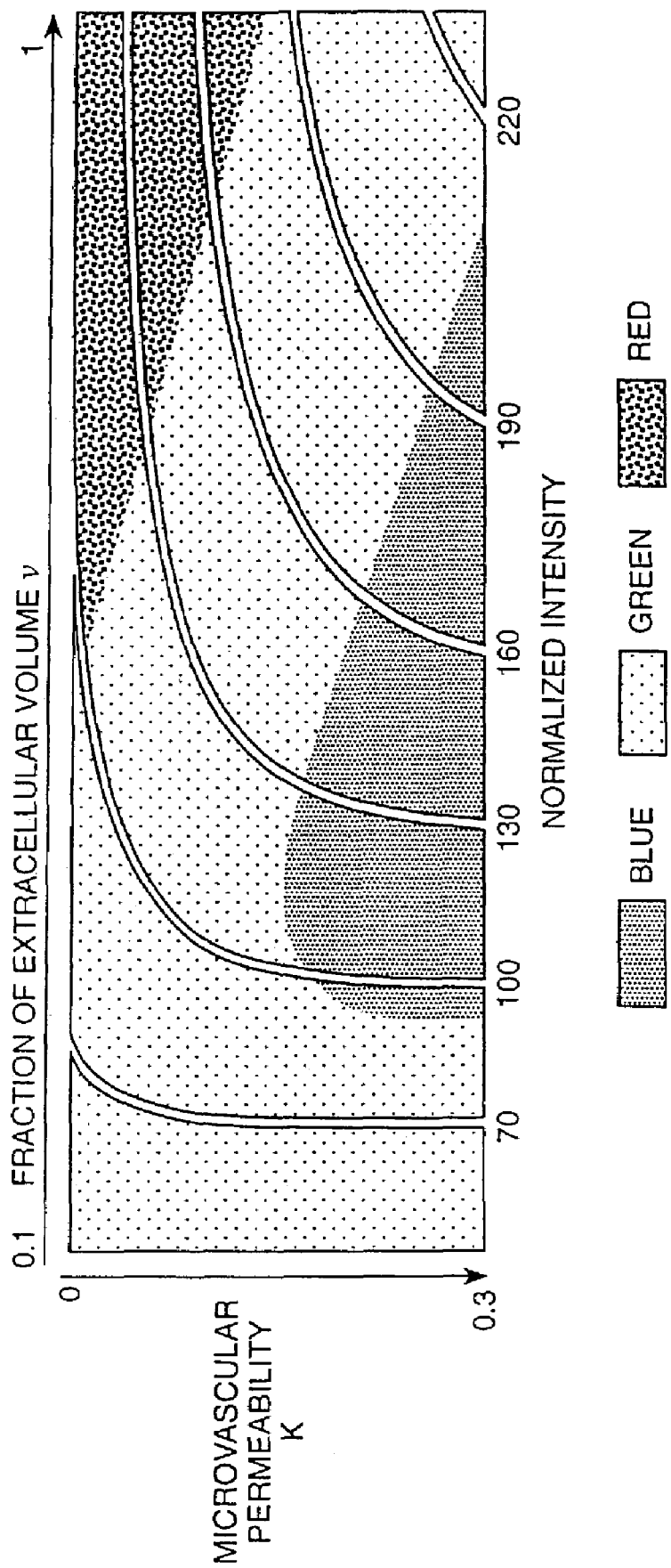
FIG. 16 is a schematic illustration of a typical calibration map as used in the novel apparatus for MRI.

Shown in FIG. 16 is a typical calibration map according to the present invention. The map was created based on the equations of contrast enhancement as known in the art, for the variables microvascular permeability K and fraction of extracellular volume v. The map is constructed as an expected pattern (e.g., color and color intensity) for any three or more selected time points. More explicitly, and with reference to FIG. 16, a three-dimensional representation in a two-dimensional drawing is used. FIG. 16 shows the time points for humans using a gradient echo and a tracer dose of 0.08 mmol/kg, with the time points: t0=0, t1=4 and t2=12 min. These time points were selected in order to discriminate between e.g., fibroadenoma and carcinoma. The isotherms represent regions of the same intensity in each pattern, e.g., same initial rate of wash-in. One dimension is microvascular permeability K ranging between values of interest (for example, 0.00 min$^{-1}$ to 0.3 min$^{-1}$). The second dimension is fraction of extracellular volume v ranging between 0.1 to 1, and the third dimension, normalized intensity, is actually the intensity of each color (for example, any value between 0 to 256 intensities). This calibration map serves to determine optimal preset time points t0, t1 and t2 and other parameters such as dose. For different systems it is possible to select different optimal time points. The calibration map also serves to interpret the output of the processing means of the apparatus, which for the specific example of MRI is a 3TP image, defined subsequently in the description. It is clear that if the three time points are chosen to be very close together the calibration map will show only a slow wash-out behavior, namely, the red pattern according to the above example will predominate. On the other hand, if the last point is chosen very far in time, the calibration map will be dominated by fast wash-out, namely, dominated by blue. The suitable 3 time points for a specific system are selected by having all three colors distributed in the most revealing way, namely, in the calibration map about one third of the area is occupied by each color.

Flow diagrams similar to the flow diagrams in FIGS. 5*a*-5*b* exist for other specific systems. At the final output, a satisfactory calibration map of the variables for an optimal set of t0, t1, t2 and other inputs is always obtained.

The time points and parameters are set at block (1) (FIG. 1) and are used by the control and effect means (3) to control and effect the data collection (FIG. 1). Referring now to FIG. 6, there is shown a detailed block diagram for controlling and effecting data collection. The input in blocks (90), (91) can be directly obtained from the storage (2) (FIG. 1) or from block (1) (FIG. 1). The measurements in blocks (92), (95) and (97) are performed by means specific for each system and stored in blocks (93), (96) and (98), respectively. Such means are known in each art. There must be control of times of tracer administration and of measure so that t0, t1 and t2 of the input are accurately controlled. The injection or administration of tracer in block (94) into the system can be performed in any known way. The timing of the tracer administration is fixed to start at t0 and should end usually, but not necessarily, before t1, preferably close to t0. The data collected in blocks (92), (95) and (97) are transferred to processing means (5) in FIG. 1, either directly from block (3) or from storage (4) in FIG. 1.

Figure 7:
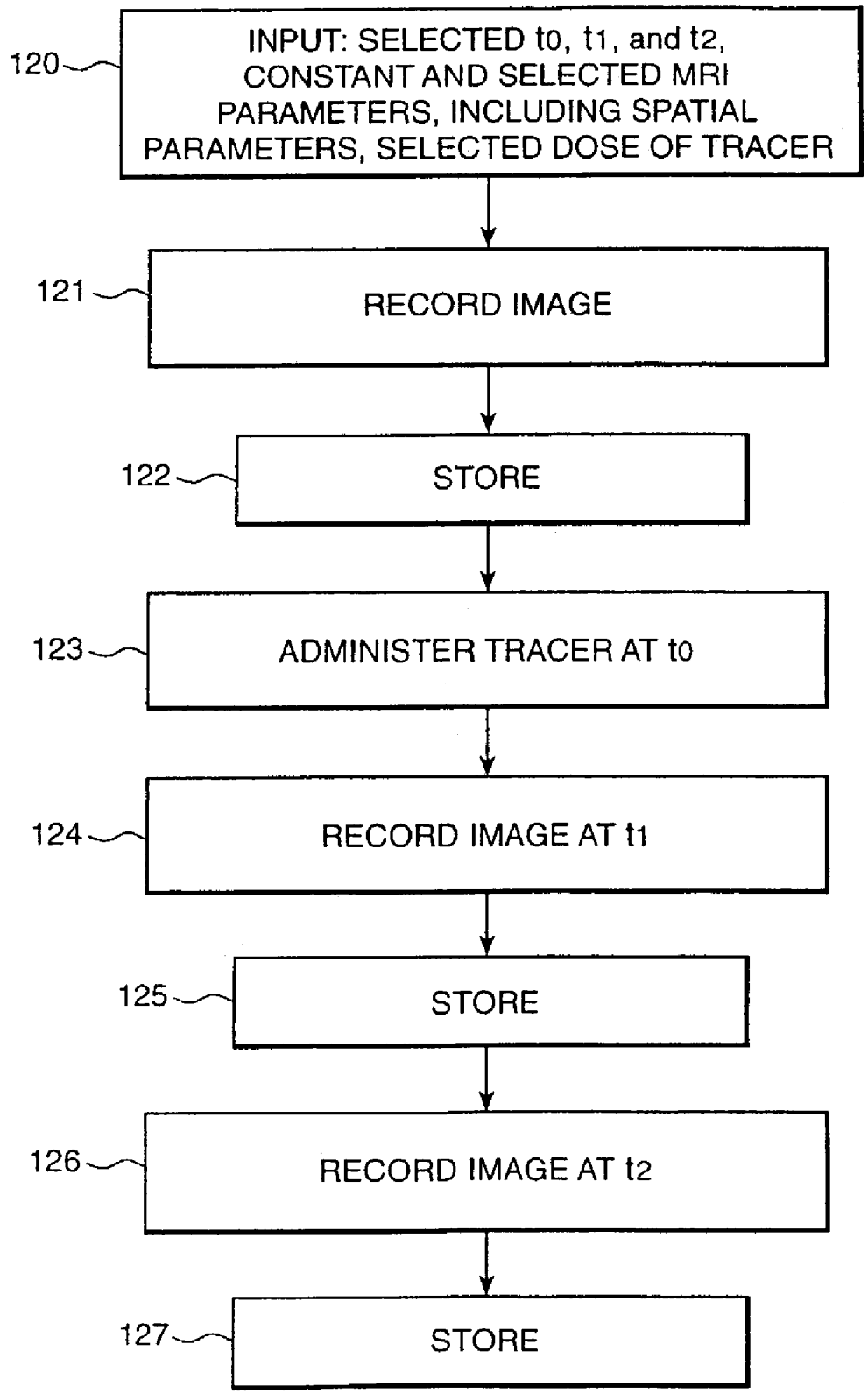
FIG. 7 is a block diagram of the apparatus as applied to MRI and shows the details of the control and effect means of the apparatus for controlling and effecting MRI data collection on a subject.

A specific example of a block diagram of a control and effect means for controlling and effecting the data collection, as part of a modified MRI apparatus or machine for tracer modulated MRI, is shown in FIG. 7. The control and effect means shown in the block diagram of FIG. 7 receives as an input in block (120) the time points t0, t1 and t2 set by the selecting means in block (1) in FIG. 1, and described in detail for this specific example in the flow diagram of FIG. 4*a*. The other inputs relate to the MRI parameters and to the dose of the tracer and the pharmacokinetic parameters of the tracer that is injected into the blood of the subject. The MRI parameters and the dose of tracer are set by the selecting means in block (1) of FIG. 1, and are described in detail for tracer modulated MRI in the flow diagram of FIG. 4. Next, the apparatus, in block (121) of FIG. 7 records an image of a defined area or a defined volume in the system, namely a body, by means known in this art. The recording parameters are those set by the selecting means (1) in FIG. 1 and inputted into block (120) in FIG. 7. The image is then stored in block (122) and a tracer, termed also a contrast agent, is administered at time t0 into the body in block (123) by any known way. This administration is timed to start at t0 for a duration that ends preferably, but not necessarily, close to time point t0 and before recording at time t1. After the administration of tracer, the apparatus, in block (124), at time t1 records an image of the same area or volume as was recorded in block (121) in the same body using the same MRI parameters as in block (121). This image is stored in block (125). Next, at time t2, the apparatus records another image in block (126) of the same area or volume in the same body, using the same MRI parameters as in block (121), and then stores this image in the storage of block (127).

Figure 8:
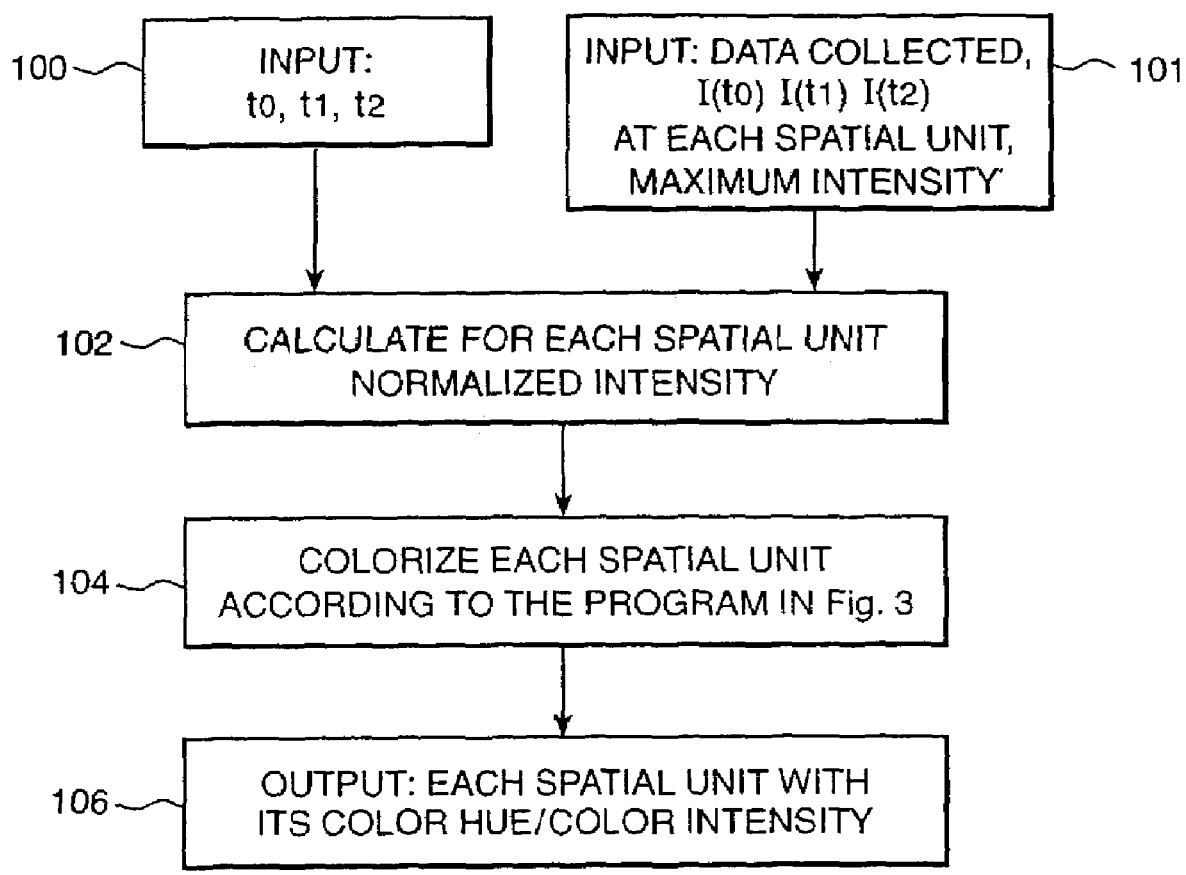
FIG. 8 is a block diagram of the apparatus of FIG. 1 showing details of the processing means of the apparatus for processing the collected data.

Referring now to FIG. 8, there is shown a more detailed block diagram of processing means shown in block (5) of FIG. 1. The inputs shown in block (100) of FIG. 8 are the time points t0, t1 and t2 set in block (1) of FIG. 1 and used in block (3) of FIG. 1. Another input shown in block (101) of FIG. 8 includes the data collected in block (3) of FIG. 1. These data can be directly transferred from block (3) of FIG. 1 or from the storage block (4) in FIG. 1. The data in block (101) of FIG. 8 for each spatial unit are presented by three data values obtained at three different times, I(t0), I(t1) and I(t2). The first data value for each spatial unit is termed I($t_o$) and is obtained before administration of the tracer. The tracer is administered at time point t0. Thus, the first data value is measured before time point t0 but as close to this time point as possible. The second data value for each spatial unit is obtained at time point t1 and is termed I(t1). The third data value for each spatial unit is obtained at time point t2 and is termed I(t2). Another input in block (101) in FIG. 8 is maximum intensity. The maximum intensity value is part of the output of the selected means as shown in block (20) in FIG. 2.

From the data I(t0), I(t1) and the time points t0, t1 the normalized intensity is then determined in block (102) for each spatial unit. The normalized intensity is given by the equation:

$$\frac{[I(t1) - I(t0)] \times N}{[I(t0)](t1 - t0) \times (\text{Max Intensity})}$$

I(t0), I(t1) and Max Intensity have been inputted in block (101) of FIG. 8. N is an integer number that can be 1, 2, 3 or 8, 64, 256 (computer numbers). N in block 102 in FIG. 8 is equal to N in block 44 in FIG. 4b, in the same monitoring of a system. Next, the apparatus in block (104) colorizes each spatial unit according to the program shown in FIG. 3. The final output in block (106) will have each spatial unit assigned with a color hue and a color intensity. The color hue represents a wash-out pattern and the color intensity represents an initial rate of wash-in. The colored output in block (106) of FIG. 8 is fed to storage (6) in FIG. 1 or directly to the analysis means in block (7) of FIG. 1. For each color and color intensity in each spatial unit in the output in block (106) of FIG. 8 there is the same color and color intensity in at least one grid point or location in the calibration map with defined values of variables of the system. Thus, the color/color intensity in each spatial unit obtained by the processing means (5) can be related to defined values of variables determined in the calibration map.

The apparatus shown in FIG. 1 functions with normalized intensities. The normalization is performed by selecting means in block (1) in FIG. 1 in the process of obtaining a calibration map defined in detail hereinbefore. The selecting means defines maximum intensity and uses the value of this maximum intensity to normalize all intensities measured to this maximum intensity. Alternatively, it is possible, but not preferred, to separate the normalization in reference to maximum intensity, performed by the selecting means, from that performed by the processing means, by choosing the maximum intensity independently by the selecting means and by the processing means. However, this weakens the correlation between the calibration map and the final output of data processing shown in block (106) of FIG. 8 and in block (126) of FIG. 9 and in block (166) of FIG. 10.

Figure 9:
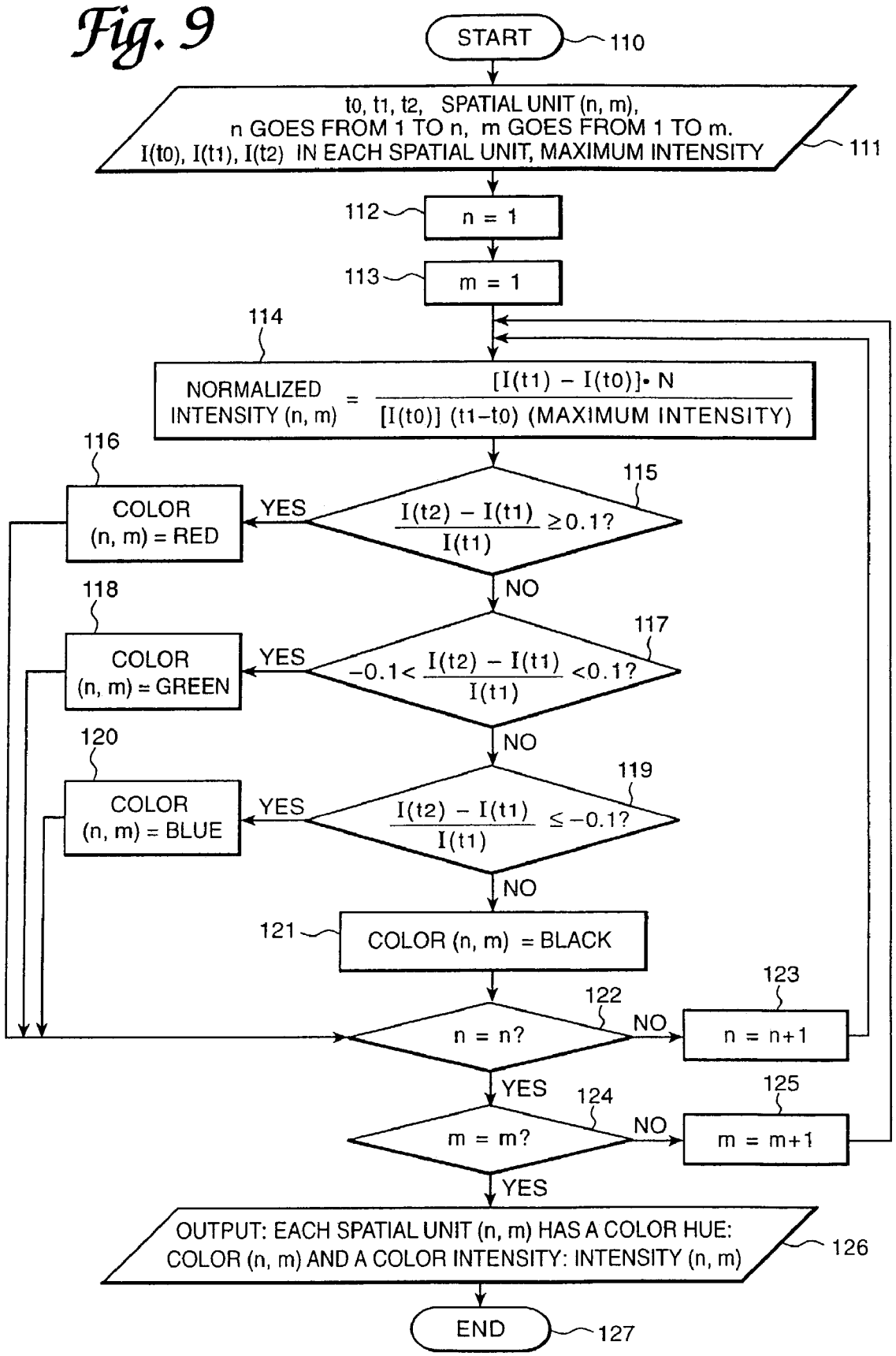
FIG. 9 is a flow diagram of the apparatus of FIG. 1 showing details of the processing means of the apparatus for processing data collected in two dimensions.

Referring now to FIG. 9, there is shown a flow diagram of steps or blocks of the apparatus for processing collected data. This diagram deals with data recorded in two dimensions so that each data point is a pixel. The first step (110) in FIG. 9 is the start. This is followed by input in step (111). The input consists of the selected time points t0, t1 and t2 set by the selected means in block (1) in FIG. 1 and used by the control and effect means in block (3) in FIG. 1. The spatial units n and m define a pixel in a grid. For the first pixel, n=1 and m=1 and then n goes from 1 to n and m goes from 1 to m in steps of 1. Another input is the collected data I(t0), I(t1) and I(t2) of each pixel. This input can be directly obtained from the control and effect means in block (3) in FIG. 1, or from the storage in block (4) of FIG. 1. The input also includes the maximum intensity which is obtained in the output of the selecting means shown in block (20) in FIG. 2, or in step (56) in the flow diagram of FIG. 4b. Next, the apparatus, in steps (112) and (113) in FIG. 9 selects the first pixel n=m=1 and in step (114) determines the normalized intensity in this pixel defined by the intensity function:

$$\frac{I(t1) - I(t0)}{[I(t0)](t1 - t0)}$$

as shown in block (64) of FIG. 5a, and by the normalization in reference to the maximum intensity of $$\frac{N}{\text{max Intensity}},$$

where N=integer≧1 as defined above. The normalized intensity is a measure of the initial rate for the wash-in behavior. N in step (114) is equal to N in step (44) in FIG. 4b in the same monitoring of a system. Next, this pixel (n=m=1) is colorized in steps (115) to (120) using the color function C according to the block diagram in FIG. 3 and according to steps (45) to (50) in FIG. 4b. This determines wash-out pattern/color hue of this pixel. If none of the possible patterns (3 patterns) occurs, for example, when I(t1)=0, the pixel is colored in black in step (121). In steps (122), (123), (124), (125) the next pixel is selected and a loop to step (114) that follows until step (120) determines for this next pixel the normalized intensity and the pattern/color hue. This loop is repeated for all pixels (n×m). In the output of step (126) in FIG. 9 each pixel has a wash-out pattern coded by a color and a wash-in initial rate coded by color intensity. The output is followed by step (127) which ends the flow diagram of FIG. 9.

Figure 10:
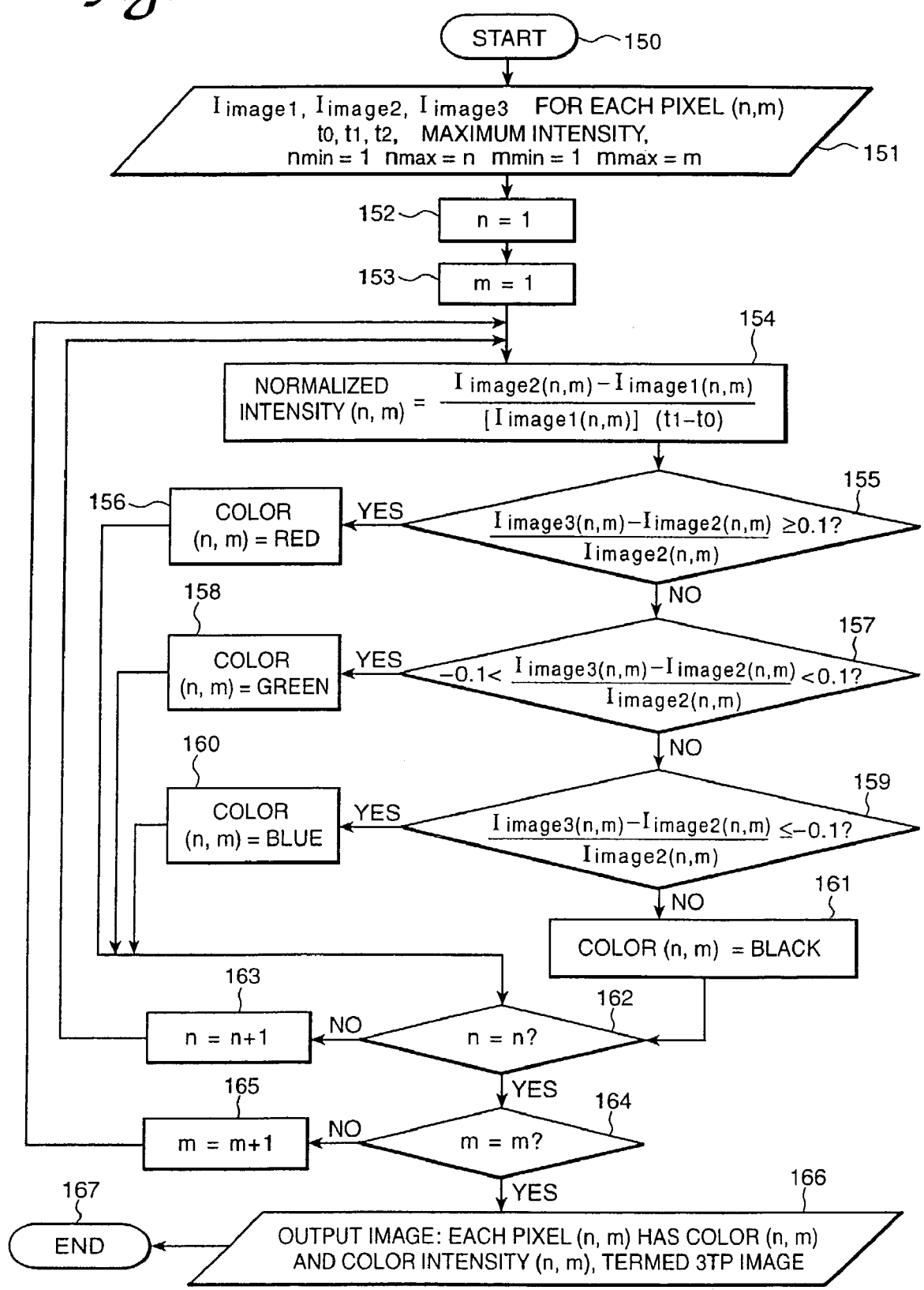
FIG. 10 is a flow diagram of the apparatus of FIG. 1 showing the details of the processing means used for MRI for processing images collected from a subject.

A specific example of a flow diagram of apparatus for processing data collected for tracer modulated MRI is shown in FIG. 10. The flow diagram starts with step (150). The next, step (151), is the input of the selected time points t0, t1, t2 set by the selecting means of the apparatus as shown for tracer modulated MRI in the apparatus depicted in the flow diagram of FIGS. 5a-5b and is part of the output step (86) in FIG. 5b. These three time points are also used by the control and effect means for data collection in the same monitoring of the body in step (151) of FIG. 10. Maximum intensity is also obtained from the output step (86) in FIG. 5b and is obtained in the same monitoring of the system, namely, the body. The input also includes the data collected by the control and effect means as shown for tracer modulated MRI in FIG. 7. These data are recorded images. There are three recorded images or three sets of recorded images of the same area or volume. The first image or set of images is recorded prior to tracer administration and close to t0. The second image or set of images is recorded at time t1 and the third image or set of images is recorded at time t2. Each pixel or voxel in the image has an MRI signal intensity which is changing with time after tracer administration. In the first image recorded prior to tracer administration, but close to the administration time, the intensity is termed $I_{image1(n,m)}$. The pixel for which n=1 and m=1 is called the first pixel with intensity $I_{image1(1,1)}$. There are n×m pixels where n goes from 1 to n and m goes from 1 to m. The intensity in each pixel(n,m) in the second image recorded at time point t1 is termed $I_{image2(n,m)}$. Similarly the intensity in each pixel(n,m) of the third image recorded at time point t2 is termed $I_{image3(n,m)}$. In steps (152) and (153) in FIG. 10 the pixels are assigned starting from n=1 and m=1. In step (154) in FIG. 10 the normalized color intensity is determined for pixel(n,m) from the values of pixel(n,m) in $I_{image1(n,m)}$ and $I_{image2(n,m)}$ according to:

$$\text{normalized intensity} = \frac{I_{image2(n,m)} - I_{image1(n,m)}}{[I_{image1(n,m)}](t1 - t0)} \times \frac{256}{\text{max intensity}}$$

The normalized intensities are determined for all pixels by a loop in steps (162), (163), (164) and (165) until all pixels have been processed.

Next, in steps (155) to (160) the wash-out pattern/color is determined for each pixel(n,m) from the values $I_{image2(n,m)}$ and $I_{image3(n,m)}$ using the color function C which is defined for this specific example as:

$$C = \text{Color Function} = \frac{I_{image2(n,m)} - I_{image3(n,m)}}{I_{image2(n,m)}}$$

and a color is chosen as shown in block (23) in FIG. 3, and as shown in steps (155) to (159) in FIG. 10. Pixels that are left uncolored through steps (155)-(160) as is the case when $I_{image2(n,m)}=0$, are assigned black in step (161). The colorizing steps, as are the normalized intensities, are looped by steps (162), (163), (164), (165) to include all pixels. The output in step (166) shows an n×m image in which each pixel(n,m) has a defined wash-out pattern/color hue and a defined wash-in rate/color intensity. This colored image is termed the three time points image or, in short, 3TP image. The color hue and color intensity are correlated to the calibration map and interpreted in terms of the values of microvascular permeability, K, and fraction of extracellular volume, v, the two variables of the subject body in the calibration map of the output in step (86) in FIG. 5b.

Figure 11:
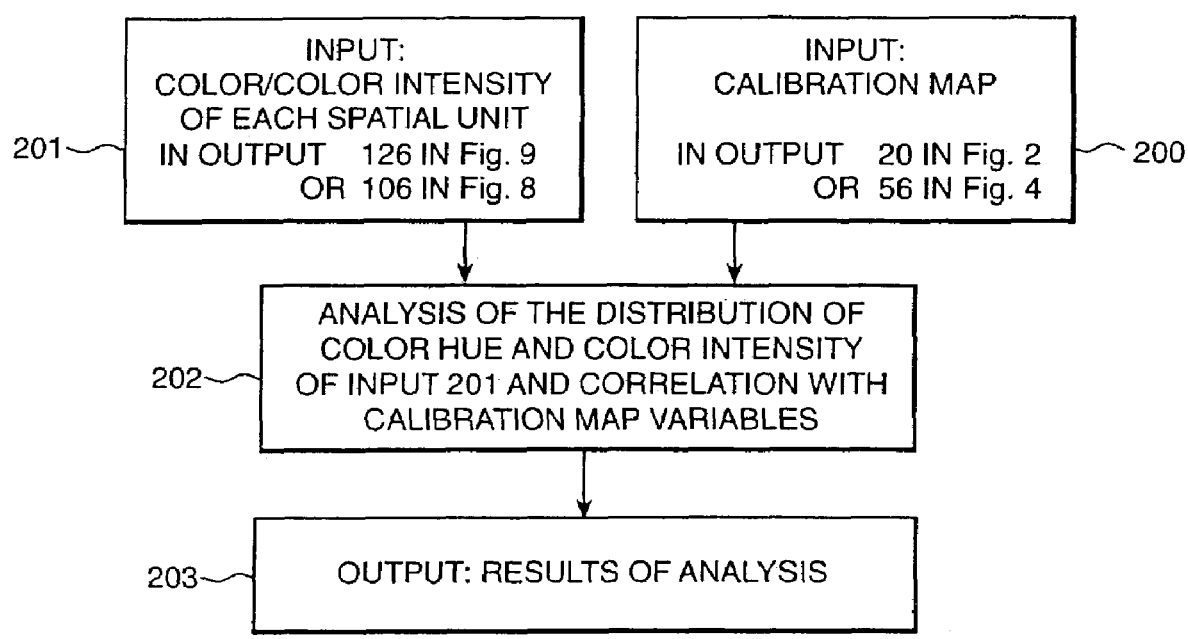
FIG. 11 is a block diagram of the apparatus of FIG. 1 showing the details of the analysis means of the apparatus for analyzing the processed data.

Referring now to FIG. 11, there is shown a block diagram of the structure of the analysis means (7) of FIG. 1. The input in block (200) consists of the calibration map obtained by the selecting means (1) of FIG. 1 and is included in the output in block (20) in FIG. 2 or in the output in block (56) in FIG. 4b. The other input in block (201) of FIG. 11 is the output of the processing means shown in block (126) in FIG. 9 or in block (106) in FIG. 8. The input in block (200) and the input in block (201) are from the same monitoring of the subject system. The analysis in block (202) consists of analysis of distribution of colors and of color intensities using for example histograms. The analysis consists also of a correlation between the calibration map and the color/color intensity of each spatial unit of the input in block (201). This correlation estimates values of the variables of the calibration map for each spatial unit in the input of block (201). Finally, the apparatus in block (203) outputs the distribution analysis and the correlation with the calibration map.

Figure 12:
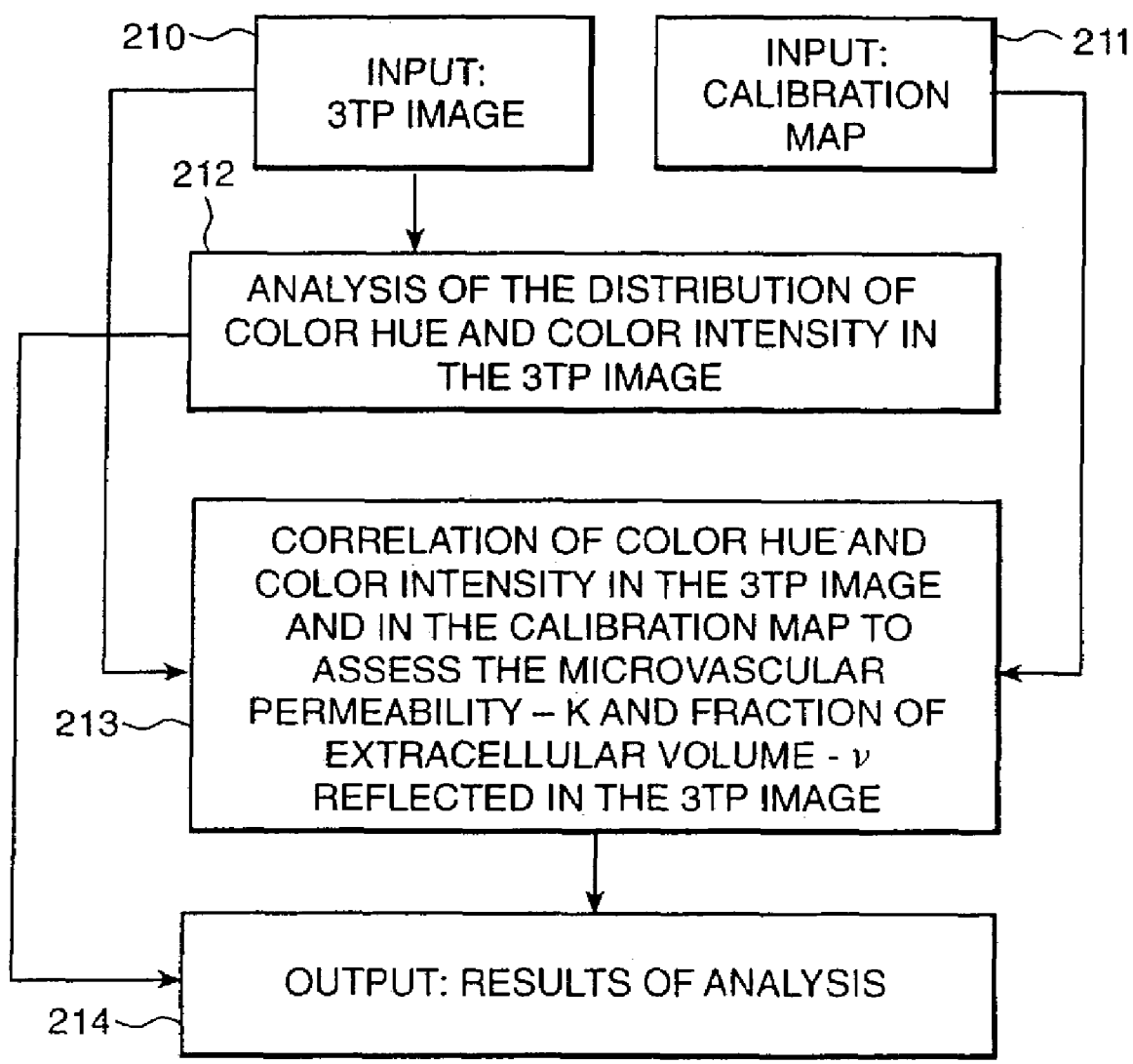
FIG. 12 is a block diagram of the apparatus of FIG. 1 showing the details of the analysis means used for MRI for analyzing 3TP images.

A specific example of that portion of the apparatus including the means for analysis of the 3TP image obtained in a tracer modulated MRI, is shown in the block diagram of FIG. 12. The input in block (210) is the 3TP image. The analysis in block (212) of the 3TP image consists of analyzing color distribution and color intensity distribution, such as determining how many pixels are colored red with a certain intensity and making a similar determination for the other colors. Also, a separate analysis of intensity distribution and of color distribution can be performed. The part of the apparatus in block (211) provides means for inputting the calibration map obtained by the selecting means as shown for tracer modulated MRI in FIGS. 5a-5b. This calibration map is for the same t0, t1, t2 and other shared parameters as the 3TP image. Analysis of the 3TP image in terms of the two variables of the calibration map K and v is shown in block (213) of FIG. 12. This correlates color hue/color intensity in each pixel of the 3TP image to the values of the pathophysiological parameters, K-microvascular permeability and v-fraction of extracellular volume, determined by the color hue/color intensity in the calibration map. Thus, the analysis is performed in terms of distributions of the two pathophysiological variables in the area or volume imaged. Finally, the apparatus in block (214) stores in a storage, or outputs as digital signals, or displays in a display device like a monitor, or is fed to a printer, and a color print is obtained one or a plurality of 3TP images/and the corresponding correlated calibration maps.

The present invention has been developed as a result of the surprising discovery that it has application to the examination of a prostate and provides a method of using the above described invention for the diagnosis of a condition of a prostate. More particularly, the present invention provides a method and apparatus for diagnosing and staging of prostate cancer. The method proves the capability of model-based techniques of dynamic contrast-enhanced MRI for use in prostate evaluation. The inventive method utilizes spatial resolution and three pre-selected Time Points (3TP) for obtaining a viable diagnosis and staging of prostate cancer.

The apparatus of the present invention includes a computer system operating electronically, optically or both, having a memory, a central processing unit, a display, an input device for generating device event signals and coacting therewith software for use with the computer. The software (in binary or related form) comprises a computer usable medium having computer readable program code thereon including the program logic for implementing the various flow charts and block diagrams described above. Since the details of computers are well known in the art and because persons skilled in the art have sufficient expertise and knowledge to be capable of implementing the flow charts and block diagrams, a detailed description of the specific hardware has been omitted as superfluous and unnecessary to a full and complete understanding and appreciation of the present invention as described above. Those skilled in the art will be able to make and use the apparatus and method of the present invention from the detailed description and teachings contained herein.

EXAMPLES

Parametric MRI of Tumor Perfusion; from Cellular Studies to Patient's Diagnosis

The growth of solid tumors relies on their perfusion through their vasculature and is determined by the volume fraction of the capillaries as well as the capillary flow and permeability. Magnetic resonance imaging can be applied in vivo for characterizing tumor perfusion and thereby provide a unique tool for monitoring and understanding the activity of angiogenic growth factors and suppressors.

Dynamic high resolution $^1$H imaging and $^2$H imaging methods were developed and applied to investigate orthotopically implanted human prostate cancer in mice. Processing algorithms based on mathematical models of the dynamic behavior were developed and applied at pixel resolution. The final analyses were presented as images of physiologic parameters (parametric images) that characterized uniquely tumor perfusion. The parametric images obtained by both methods revealed the high heterogeneity of cancer perfusion, emphasizing the importance of monitoring and processing perfusion at high spatial resolution.

The results of these studies led to the development of a computer aided new parametric method for prostate cancer diagnosis. The method scans high resolution contrast enhanced images at three different time points judiciously chosen to maximize the dynamic information, hence the term 3TP, or 3 Time Point method. Processing algorithms relate the changes in signal intensity to the kinetics of the contrast time evolution using a color coded scheme. Clinical testing of this method demonstrated the ability of the 3TP method to diagnose and stage prostate cancer.

Parametric Contrast-Enhanced MRI for Prostate Cancer Diagnosis and Staging

Imaging prostate cancer is a subject of controversy. Currently, no consensus exists on the use of MRI in the diagnosis or the evaluation of local tumor extent in patients with prostate cancer.

MRI can scan the prostate using external coils or endorectal coils. Endorectal MRI imaging is superior in spatial resolution.

T2-weighted images characterize the internal structure of the prostate and provide high contrast between tumor and normal tissue. The diagnostic criteria used are: low signal intensity, irregular contour, a bulge in the contour of the prostate next to the low signal intensity lesion, thickening of the prostate capsule, retraction of the capsule, and an extracapsular tumor with a low signal intensity abnormality adjacent to, but outside the capsule.

Dynamic contrast-enhanced MRI monitors changes in the uptake and clearance of the contrast agent. The diagnostic criteria used are: fast contrast enhancement followed by fast decay, and heterogeneous signal enhancement. Image analysis of the time curves of contrast enhancement, using a kinetic model, yields parametric maps of pathophysiological properties. The product microvascular permeability×surface area, is high in tumors, low in the peripheral zone, and varying from low to high in the central gland.

With clinical MRI, it is difficult to achieve in a dynamic scanning both high spatial and temporal resolution. The non-empiric, model-based contrast-enhanced method of the present invention optimizes spatial resolution and selects sufficient dynamic information, yielding parametric images of diagnostic value.

The method of the present invention for prostate diagnosis is based on monitoring intensity changes in sequential images recorded before and after administration of a contrast agent such as, but not limited to, gadodiamide. The images are recorded at three time points (hence the name 3TP), judiciously chosen to maximize the diagnostic information.

Mathematical algorithms estimate at pixel resolution two physiological parameters, PS/V and EVF, that correspond to the two variables K and v, respectively, described hereinbefore in the specification:

PS/V—Microvascular (Permeability×Surface area) per unit Volume

EVF—Extracellular Volume Fraction

Model-based methods of dynamic contrast-enhanced MRI including the 3TP method that optimizes spatial resolution and uses 3 pre-selected Time Points, were evaluated for diagnosis and staging of prostate cancer. Parametric images of PS/V (K) and EVF (v) and combined, color-coded images of these two parameters, were constructed. Suggested diagnosis of cancer was based on predominance of pixels with high permeability and low to intermediate EVF. Highly suspicious peripheral zone areas correlated with pathologic findings, which also served to verify local extensions. The results demonstrated the feasibility of these standardized methods to improve prostate cancer imaging.

Clinical Examples

Sixteen patients divided into two groups were investigated. Group I consisted of five patients with biopsy-proven prostate cancer, that were candidates for radical prostatectomy. In this group MRI was performed 4-6 weeks after biopsy, and just prior to surgery. MRI was correlated with detailed histologic analysis of the prostatectomy specimens. Group II consisted of eleven patients that were suspected to have prostate cancer based on elevated PSA levels and positive DRE findings. These patients were studied several weeks (at least 3 weeks) after TRUS guided needle biopsy, because post-biopsy hemorrhage may interfere with the interpretation of MR images. Three patients in this group were studied twice: before and 4-6 weeks after biopsy. All patients signed an informed consent approved by Tel Aviv Sourasky Medical Center Committee.

MRI Imaging Protocol

MRI was recorded at 1.5 Tesla (GE Signa Horizon LX MRI Scanner, Milwaukee, Wis., USA), using a TORSO phased-array coil. The protocol included $T_2$-weighted spin-echo (SE) images with TR=5240-5250/TE=102-104 ms, followed by dynamic-$T_1$-weighted 3D fast gradient-echo (GRE) images of the whole pelvis with the following parameters: TR=11.1/TE=4.2 ms; flip angle=20°, and the same resolution as the $T_2$-weighted images: FOV=16 cm, matrix=256×160, slice thickness=3 mm. Eight consecutive 3D fast gradient-echo image sets each~1 min temporal resolution, were acquired with the contrast agent Gadodiamide (GdDTPA; 0.1 mmol/kg weight) administered after the first set. Optical time points: 0; 1.5 and 6.5 minutes post contrast.

Two image processing techniques of the dynamic contrast enhanced MRI were evaluated: 1. Fitting the non-linear dynamic changes to the Tofts model (P. S. Tofts and A. G. Kermode, *Magn. Reson. Med.*, 17, 357-367, 1991) yielding parametric images (E. Furman-Haran, D. Grobgeld and H. Degani, *J. Magn. Reson.*, 128, 161-171, 1997) of PS/V and EVF. 2. Analyzing the first, third and seventh dynamic sets by the 3TP method to produce color maps that are related to EVF and PS/V by a model-based calibration map.

Experimental Considerations

The change in the MRI signal intensity reflects a change in the concentration of the contrast material (Ct) which is determined by PS/V and EVF (P. S. Tofts and A. G. Kermode, *Magn. Reson. Med.*, 17, 357-367, 1991). MRI signal intensity (SI) is a function of sequence parameters, the pharmacokinetics and relaxivity of the contrast agent, T10 of the tissue, and Ct.

The 3TP algorithm reads the SI of the MR images recorded at one pre-contrast time point (t0) and at two post-contrast time points (t1 and t2). The algorithm then codes the SI change on a per pixel basis, between the three time points using color intensity and color hue which relate to a model based calibration map that uses the same color coding.

Figure 17A:
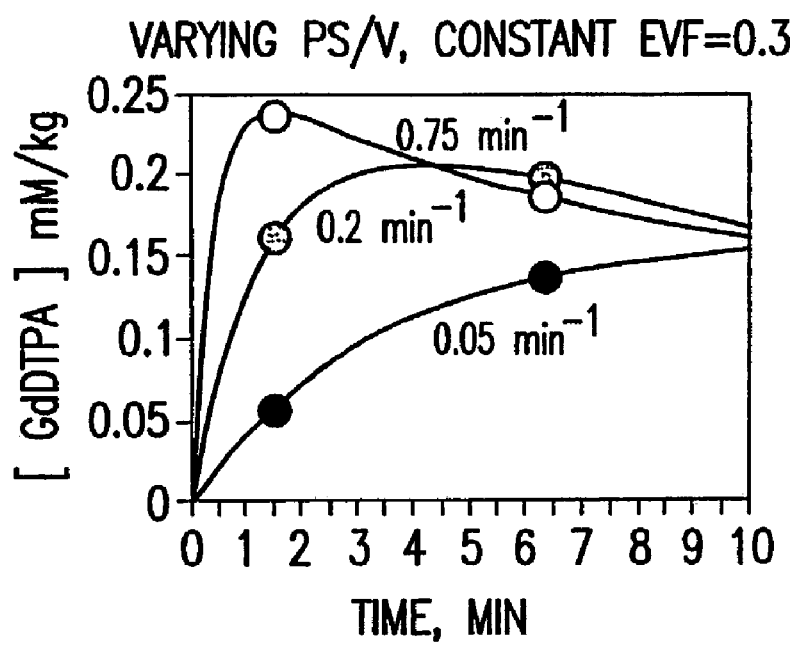
FIGS. 17a-17b depict time curves of contrast agent concentration with varying K and constant v, and with varying v and constant K, respectively.
Figure 17B:
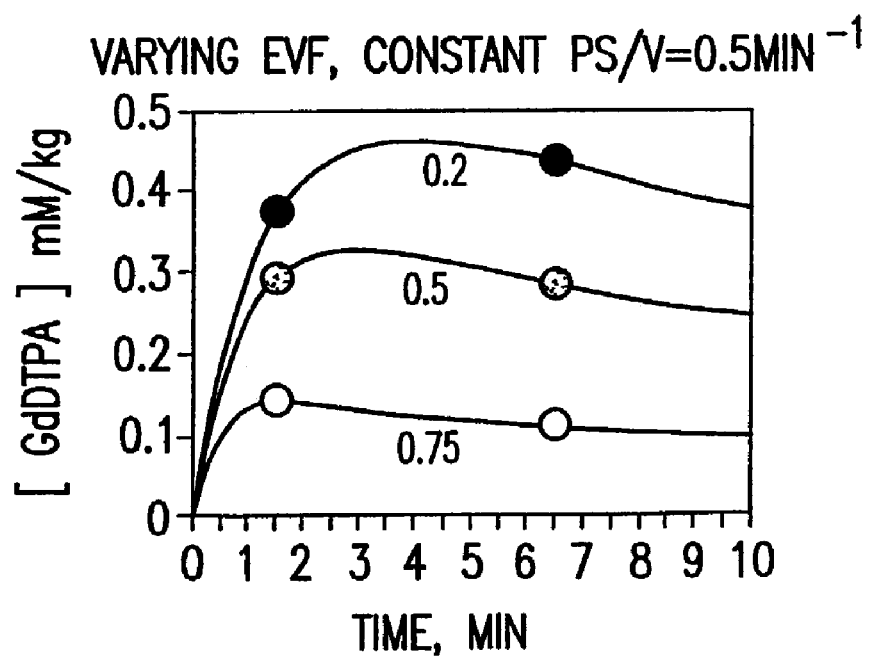

FIG. 17a depicts time curves of contrast agent concentration with varying PS/v and constant EVF=0.3, and FIG. 17b depicts time curves of contrast agent concentration with varying EVF and constant PS/V=0.5 $min^{-1}$. By selecting the three time points: 0, 1.5 min and 6.5 min, a good separation between the different patterns of contrast enhancement is achieved.

Figure 18A:
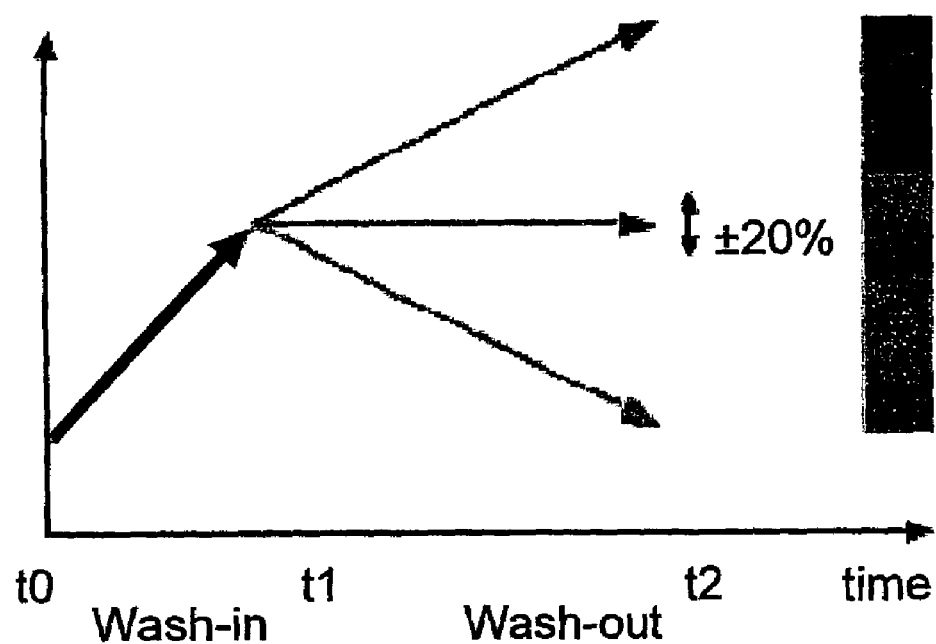
FIGS. 18a-18b depict, respectively, a graph of the wash-out (color hue)/wash-in (color intensity) pattern for the three time points t0, t1 and t2, and the 3TP calibration map for the pre-selected time points: 0, 1.5 and 6.5 min.
Figure 18B:
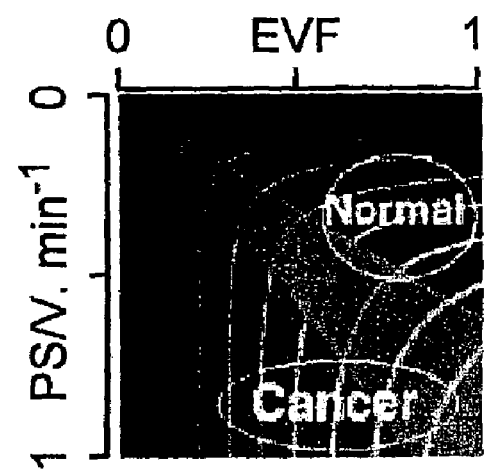

FIG. 18a, similar to FIGS. 13, 14 and 15, describes systematically the principles of choosing a wash-out pattern which is coded in color hue and denotes the clearance of contrast agent from the tumor, and of choosing wash-in initial rate which is coded in color intensity, and denotes uptake of contrast agent in the tumor. For each pattern of wash-out coded by a color hue, there can be defined a wash-in rate which relates to the intensity function which determines color intensity. The separation between different wash-in rates depends on the range of color intensities chosen. Color intensities range between 0 to 255, with the fastest initial rate scaled to 255. FIG. 18b is a schematic illustration of the 3TP calibration map for the pre-selected time points: 0, 1.5 and 6.5 min. Based on the model, a calibration map is calculated that relates changes in the color coding of the enhancement to PS/V and EVF.

RESULTS

Our goal was to test the capability to diagnose and stage prostate cancer by model-based methods of dynamic contrast-enhanced MRI, applied with a torso phased array coil. The methods follow changes in signal enhancement and relate them to the physiologic parameters PS/V and EVF accessible to the contrast agent, including the method of the invention that emphasizes high spatial resolution and uses enhancement data from three pre-calculated time points (3TP). A summary of the results obtained thus far of a blind clinical trial is presented here and described in Tables 1-3 hereinafter.

To test the ability of the 3TP method in staging prostate cancer, patients of Group I, candidates for radical prostatectomy, were subjected to MR imaging 4-6 weeks after biopsy.

Figure 20:
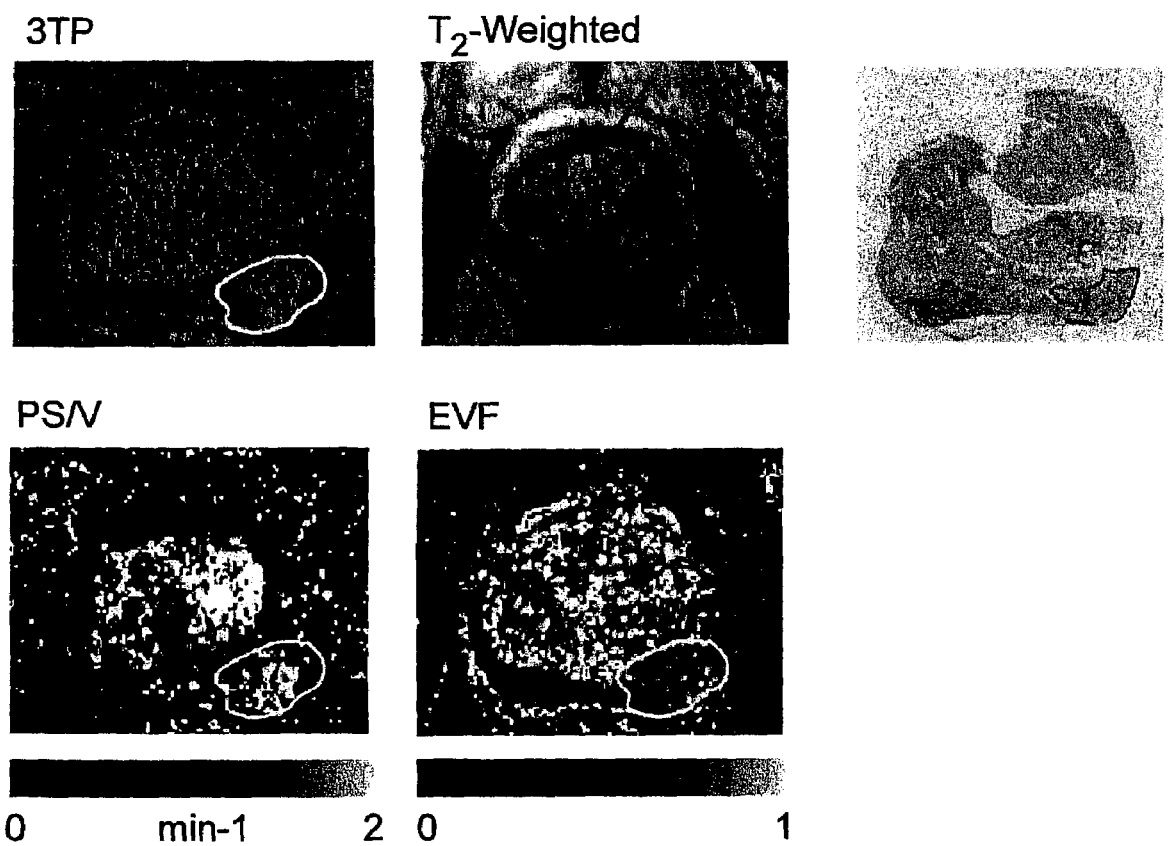
FIG. 20 shows analysis of the images of FIG. 19.

FIG. 19 shows dynamic contrast-enhanced MR images at pre-contrast (left), 30 s post-contrast (middle) and 6.5 min post-contrast (right) of a 64-years old patient (patient #1, Table 1), at pathologic stage pT3a. In the post-contrast images, both the tumor and the central gland enhance and the peripheral zone shows minimal enhancement. The 6.5 min image shows wash-out of the contrast in the tumor and central gland. FIG. 20 shows analysis of the dynamic contrast-enhanced MR images. The tumor is characterized by high PS/V and low EVF values (high cell density), exhibiting green and bright red pixels in the 3TP image. Benign prostatic hypertrophy (BPH) in the transition zone also exhibit high PS/V but, unlike the tumor region, it exhibits hyper-intensity in the T2-weighted images. Tumor margins are best delineated in the 3TP image. MRI tumor stage according to the 3TP method and to the T2-weighted images matched the pathologic stage.

FIG. 21 shows analysis of dynamic contrast-enhanced MR images of a second patient, 66-years old (patient #2, Table 1), at pathologic stage pT3c. The bright red and bright green regions in the peripheral zone of the 3TP image correspond to cancer tissue. Transitional zone BPH is also characterized by fast wash-out, but unlike the tumor regions it exhibits hyper-intensity in the T2-weighted images. The T2-weighted images exhibited a multifocal tumor at the peripheral zone Extracapsular invasion and seminal vesicles invasion (not shown in the figure) were observed in the 3TP images, but not in the T2-weighted image. Therefore tumor stage with the 3TP method matched the pathologic stage, while staging according to the T2-weighted images yielded an underestimation of the pathologic stage.

To test the viability of the 3TP method in diagnosis of prostate cancer, MR imaging was performed before biopsy in patients with elevated PSA levels.

FIG. 22 shows analysis of contrast-enhanced MR images of a patient, 52-years old (patient #2, Table 2), with PSA=16.4 ng/ml. 3TP images: Tumor in both sides of the peripheral zone; extracapsular invasion to the periprostatic tissue; and seminal vesicles (SV) involvement. T2-weighted images: tumor in right side of the peripheral zone; involvement of the rectal wall cannot be excluded; no SV involvement. Pathologic findings: in 7 out of 10 cores prostatic adenocarcinoma as observed with Gleason's grade score 6-8, infiltrating 40-90% of the cores.

Thus, using the external torso phased array coil we were able to obtain high resolution images and monitor the dynamics of contrast enhancement. The two processing methods yielded congruent results. Suggested diagnosis of cancer was based on the predominance of pixels with high PS/V (PS/V>0.8 $min^{-1}$) and low to intermediate EVF values (0.3<EVF<0.7). In the radical prostatectomy group (Table 1) suspicious peripheral zone areas that were delineated in the 3TP images correlated well with the detailed histopathology specimens. In addition, the 3TP method indicated local extension that was verified by pathology. Transitional zone (TZ) benign prostatic hyperplasia (BPH) demonstrated properties similar to peripheral zone (PZ) cancers in terms of high permeability, however, in the $T_2$-weighted images these regions appeared much brighter than the peripheral cancers.

For the patients in Group II, diagnosis based on the 3TP method was verified by the findings of TRUS guided needle biopsy indicating tumor or high grade prostatic intraepithelial neoplasia (PIN) presence (n=7). Two patients with elevated PSA levels and negative biopsy findings were staged by the 3TP method as T2 and T3 extracapsular invasion (ECI), respectively. The PSA of these patients continued to increase and thus these patients needed to undergo repeated biopsies. We also confirmed that there were no changes in the physiologic parameters caused by biopsy intervention (n=3).

SUMMARY

In this study we have designed a high resolution prostate MRI protocol for dynamic contrast enhancement, and applied model based image analysis algorithms that yielded parametric maps reflecting the angiogenic and growth capacity of the lesions. The parametric images enabled us to diagnose prostate cancer in peripheral zone areas and delineate tumor margins and extended growth. BPH in the transitional zone exhibited high PS/V but, unlike cancers, it exhibited hyper-intensity in the $T_2$-weighted images. This approach provides a unique opportunity to develop a non-invasive and standardized technique for prostate cancer diagnosis.

Although the invention has been described in detail, nevertheless changes and modifications which do not depart from the teachings of the present invention will be evident to those skilled in art. Such changes and modification are deemed to come within the purview of the present invention and the appended claims.

TABLE 1

Radical Prostatectomy Patients (Group 1)

| Patient # (Age) | PSA ng/ml | Pathology | Gleason Score | MRI Tumor Stage* T2-weighted | MRI Tumor Stage* 3TP |
|---|---|---|---|---|---|
| 1 (64) | 8.3 | stage pT3a | 7 | T3 ECI | T3 ECI |
| 2 (66) | 11.7 | stage pT3c | 7 | T2 | T3 ECI, SV |
| 3 (60) | 7.5 | stage pT2b | 6 | T3 SV | T3 ECI |
| 4 (60) | 6.7 | stage pT3a | 7 | T2 | T3 ECI |
| 5 (67) | 13 | stage pT2c | 9 | T2 | T2 |

TABLE 2

Positive Prostate Biopsy

| Patient # (Age) | PSA ng/ml | Biopsy | Gleason Score | MRI Tumor Stage* T2-weighted | MRI Tumor Stage 3TP |
|---|---|---|---|---|---|
| 1 (81) | 2000 | +(8/8, +1/1 in SV) | 7 | T2 | T3 ECI, SV |
| 2 (52) | 16.4 | +(7/11) | 8 | T3 ECI | T3 ECI, SV |
| 3 (76) | 50 | +(10/11, +0/2 in SV) | 7 | T3 ECI | T3 ECI, SV |
| 4 (83) | 56 | +(10/10) | 9 | T3 ECI, SV | T3 ECI, SV |
| 5 (58) | 97 | +(0/15 + 6/6 in TZ) | 6 | 10 | T2 (in PZ) |

ECI—extracapsular invasion;
SV—seminal vesicles involvement;
TZ—transitional zone;
PZ—peripheral zone.
*Definitions of MRI Tumor Stage: T0—tumor not visible by MRI; T1—presence of tumor cannot be excluded; T2—tumor confined to the prostate; T3—tumor extands through the capsule.

TABLE 3

Negative Prostate Biopsy

| Patient # (Age) | PSA ng/ml | Biopsy | Gleason Score | MRI Tumor Stage* T2-weighted | MRI Tumor Stage* 3TP |
|---|---|---|---|---|---|
| 1 (63) | 24.3 | PIN-high grade | — | T2 | T3 ECI |
| 2 (65) | 7.78 | PIN-high grade | — | T0 | T0 |
| 3 (54) | 7 | No evidence of tumo | — | T1 | T2 |
| 4 (71) | 12.2 | No Biopsy yet | — | T3 ECI | T2 |
| 5 (72) | 15 | No evidence of tumo | — | T0 | T0 |

The invention claimed is:

1. Apparatus for monitoring a human body in which a fluid flows and which is characterized by a change in the system with time in space for determining a prostate condition for diagnosing cancer comprising: (a) monitoring means for monitoring a preselected place in a human body for collecting data indicative of a parameter of the prostate that varies with time as a function of at least one variable related to wash-in and wash-out behavior; (b) first data processing means responsive to the monitoring means for receiving the collected data and processing same; (c) selecting means for controlling the monitoring means for setting parameters of data collection, and for receiving inputs of body parameters including said prostate parameter and a plurality of time points correlated to a body event; (d) second data processing means including: (1) grid means for dividing the space defined by the at least two variables, each ranging from a minimum to a maximum, into a grid; (2) first determining means for determining for each grid location a calculated value and intensity function indicative of the wash-in of the parameter being monitored for each time point; (3) first normalizing means for determining a grid location of maximum intensity and normalizing all grid locations with reference to the maximum; (4) first colorizing means for coloring all grid locations one of a plurality of colors based on a color function indicative of wash-out behavior; (5) arranging means for arranging all grid locations for all time points into a composite to develop a calibration map of the grid with each grid location correlated to a color hue/color intensity; (6) analyzing means for analyzing the calibration map to determine if the attributes of the calibration map meet a preselected standard and, if not, to implement the plurality of time points or a body parameter and iterate until the resultant calibration map meets said standard; (e) said first data processing means receiving as further inputs the plurality of time points and the maximum of the intensity function as determined in the second data processing means and further including: (1) division means for spatially dividing the preselected place in the system into spatial units; (2) second determining means for determining for each spatial unit a value and intensity function indicative of wash-in behavior based on the collected data for each time point; (3) second normalizing means for normalizing the intensity of each spatial unit based on maximum intensity obtained from the first normalizing means; (4) second colorizing means for coloring all spatial units one of a plurality of colors based on the color function indicative of wash-out behavior of said first colorizing means; (5) arranging means for arranging all spatial units for all time points into a composite of the preselected space with each spatial unit correlated to a color hue/color intensity.

2. Apparatus according to claim 1 wherein the first colorizing means provides one color if the color function is greater than or equal to X indicative of slow wash-out behavior, a second color if the color function is less than X and greater than or equal to Y indicative of moderate wash-out behavior, and a third color if the color function is less than Y indicative of fast wash-out behavior, where X and Y are decimals less than one with X being positive and Y being negative.

3. Apparatus according to claim 2 wherein X equals 0.1 and Y equals −0.1.

4. Apparatus according to claim 1 wherein three time points are used t0, t1 and t2, with t0 being the time at the beginning of the system event, t1 being a time after t0 and t2 being a time after t1.

5. Apparatus according to claim 1 wherein the body event is the injection of a tracer material into the fluid flowing in the system.

6. Apparatus according to claim 5 wherein the apparatus is an MRI system.

7. Apparatus according to claim 1 wherein a display means is provided to display the resultant calibration map and the composite of the preselected place.

8. Apparatus according to claim 1 wherein a storage is provided to store the resultant calibration map and the composite of the preselected place.

9. Apparatus according to claim 1 wherein a printer means is provided to print the resultant calibration map and the composite of the preselected place.

10. Apparatus for monitoring a prostate in a human body in which a fluid flows and which is characterized by a change in the prostate with time in space comprising: (a) monitoring means including a first output for monitoring a preselected place in the prostate for collecting data indicative of a parameter that varies with time as a function of at least two variables related to wash-in and wash-out behavior, (b) first processing means including a second output and a first input for receiving the collected data from the first output and processing same, (c) selecting means including a third output for controlling the monitoring means, for setting parameters of data collection and for providing input to the first input, the selecting means including: (i) input means for receiving inputs of parameters including said parameter and a plurality of preselected time points correlated to an event, (ii) a second processing means including: (1) grid means for dividing the space defined by the at least two variables, each ranging from a minimum to a maximum, into a grid, (2) first determining means for determining for each grid location a calculated value of intensity of the parameter being monitored for each time point, (3) first normalizing means for determining the maximum intensity of the grid locations and normalizing all grid locations with reference to the maximum, (4) first colorizing means for coloring all grid locations one of a plurality of colors based on a correlation with wash-out behavior, (5) arranging means for arranging all grid locations for all time points into a composite to develop a calibration map of the grid with each grid location correlated to a color hue/color intensity, (6) analyzing means for analyzing the calibration map to determine if the color distribution of the calibration map satisfies a predetermined condition and, if not, to implement one of the plurality of time points and a parameter and inputting to the input means for iteration until the resultant calibration map satisfies the predetermined condition, (d) said first processing means receiving as further inputs the plurality of time points and the maximum of the intensity function as determined in the second processing means, and further including: (i) division means for spatially dividing the preselected place in the prostate into spatial units, (ii) second determining means for determining for each spatial unit a value and intensity based on the collected data for each time point, (iii) second normalizing means for normalizing the intensity of each spatial unit based on maximum intensity obtained from the first normalizing means, (iv) second colorizing means for coloring all spatial units one of a plurality of colors based on the correlation with wash-out behavior used in the first colorizing means, (v) arranging means for arranging all spatial units for all time points into a composite of the preselected place with each spatial unit correlated to a color hue/color intensity.

11. Software for use with a computer having a memory, an input device for generating device event signals and a display, the software comprising a computer usable medium having computer readable program code thereon including: first program logic for dividing into a grid a space defined by two variables correlated to a preselected parameter of a prostate in a human body in which fluid flows-which is characterized by a change in the prostate with time in space, each variable ranging from a minimum to a maximum; second program logic responsive to device event signals for determining intensity of each grid location at each of a plurality of time points based on a predetermined intensity function; third program logic responsive to the second program logic to color all grid locations based on a predetermined color function; and fourth program logic responsive to the third program logic for developing a composite calibration map of the grid with each grid location correlated to a color hue/color intensity.

12. Software as in claim 11 further including fifth program logic responsive to the fourth program logic for displaying the calibration map on the display.

13. Software as in claim 11 further including fifth program logic responsive to the fourth program logic for analyzing the calibration map to determine if it satisfies a predetermined condition.

14. Software as in claim 13 further including sixth program logic responsive to the fifth program logic to determine whether the condition is satisfied, and, if not, to iterate the program logic to adjust the calibration map until the condition is satisfied.

15. Data processing system for producing a calibration map for use with a monitored prostate in a human body in which a fluid flows and which is characterized by a change in the monitored prostate with time in space and wherein the monitoring occurs at a preselected location comprising: (a) computer processing means for processing data; (b) storage means for storing data on a storage medium; (c) means for initializing the storage medium; (d) processing means for dividing the space defined by two variables, each ranging from a minimum to a maximum, into a grid, said variables being con-elated to a preselected parameter of the monitored prostate; (e) processing means for determining for each grid location a calculated value and intensity function of the parameter at each of a plurality of time points; (f) processing means for determining the maximum of the intensity function of the grid locations and normalizing all grid locations with reference to the maximum; (g) processing means for coloring all grid locations one of a plurality of colors based on a color function correlated with monitored prostate behavior; (h) processing means for arranging all grid locations for all time points into a composite to develop a calibration map of the grid with each grid location correlated to a color hue/color intensity; and (i) processing means for analyzing the calibration map to determine if the attributes of the calibration map meet a predetermined condition, and, if not, to implement the plurality of time points or variables and iterating until the attributes of the resultant calibration map meet the predetermined condition.

16. The data processing system of claim 15 wherein the attribute is color distribution.

17. The data processing system of claim 16 wherein the condition is substantially equal coloring of the colors of the calibration map.

18. Data processing method for producing a calibration map for use with a monitored prostate in a human body in which a fluid flows and which is characterized by a change in the monitored system with time in space and wherein the monitoring occurs at a preselected location comprising the steps of: (a) processing data; (b) storing data on a storage medium; (c) initializing the storage medium; (d) processing by dividing the space defined by two variables, each ranging from a minimum to a maximum, into a grid, said variables being correlated to a preselected parameter of the monitored prostate; (e) processing for determining for each grid location a calculated value and intensity function of the parameter at each of a plurality of time points; (f) processing for determining the maximum of the intensity function of the grid locations and normalizing all grid locations with reference to the maximum; (g) processing for coloring all grid locations one of a plurality of colors based on a color function correlated with monitored prostate behavior; (h) processing for arranging all grid locations for all time points into a composite to develop a calibration map of the grid with each grid location correlated to a color hue/color intensity; and (i) processing for analyzing the calibration map to determine if the attributes of the calibration map meet a predetermined condition, and, if not, to implement the plurality of time points or variables and iterating until the attributes of the resultant calibration map meet the predetermined condition.

19. Method for monitoring a prostate in a human body in which a fluid flows and which is characterized by a change in the prostate with time in space comprising the steps of: (a) monitoring a preselected place in the prostate for collecting data indicative of a parameter that varies with time as a function of at least two variables related to wash-in and wash-out behavior; (b) processing collected data; (c) controlling the monitoring by setting parameters of data collection and selecting a plurality of time points correlated to a prostate event; (d) dividing the space defined by the at least two variables, each ranging from a minimum to a maximum, into a grid; (e) determining for each grid location a calculated value and intensity function of the parameter being monitored for each time point; (f) determining the maximum intensity of the grid locations and normalizing all grid locations with reference to the maximum; (g) coloring all grid locations one of a plurality of colors based on a color function correlated with wash-out behavior; (h) arranging all grid locations for all time points into a composite to develop a calibration map of the grid with each grid location correlated to a color hue/color intensity; (i) analyzing the calibration map to determine if the attributes of the calibration map meet a preselected condition and, if not, to implement the plurality of time points or a system parameter and iterating until the attributes of the resultant calibration map meet the preselected condition; (j) inputting the plurality of time points and the maximum of the intensity function as determined in step (f) to the processing of step (b) which further includes the steps of: (i) spatially dividing the preselected place in the prostate into spatial units; (ii) determining for each spatial unit a value and intensity function based on the collected data for each time point; (iii) normalizing the intensity of each spatial unit based on maximum intensity obtained from step (f); (iv) colorizing all spatial units one of a plurality of colors based on the color function of step (g); (v) arranging all spatial units for all time points into a composite of the preselected place with each spatial unit correlated to a color hue/color intensity.

20. The method according to claim 19 wherein the attribute is color distribution.

21. The method according to claim 20 wherein the condition is substantially equal coloring.

22. The method according to claim 19 wherein the prostate event is injection of a tracer into the fluid of the prostate upstream of the preselected place.

23. The method according to claim 19 wherein two time points are used.

24. The method according to claim 22 wherein three time points are used t0, t1 and t2, to being near in time to injection, t1 being a predetermined time later than t0 indicative of prostate wash-in behavior and t2 being a predetermined time later than t1 indicative of prostate wash-out behavior.

25. A calibration map for use in monitoring a prostate of a human body in which fluid flows and which is characterized by a change in a prostate parameter with time in space as a function of two variables related to prostate wash-in and system wash-out behavior at two time intervals after a prostate event, which map depicts in two or three dimensions an image of the two variables ranging from a minimum to a maximum wherein the discrete elements of the image have a color hue of one of a plurality of colors indicative of prostate wash-out behavior and a color intensity indicative of prostate wash-in behavior.

26. A calibration map according to claim 25 wherein the image is a display on a monitor.

27. A calibration map according to claim 25 wherein the image is digitally encoded on a computer readable medium.

28. A calibration map according to claim 25 wherein the image is printed on a printable medium.

29. A calibration map according to claim 25 wherein three colors are used.

30. A calibration map according to claim 29 wherein the colors are red, blue and green.

31. An image depicting in two or three dimensions a location in a prostate in a human body in which fluid flows and which is characterized at said location by a change in a prostate parameter as a function of two variables related to prostate wash-in behavior at a first time interval and prostate wash-out behavior at a second time interval after a prostate event, the discrete elements of the image having a color hue of one of a plurality of colors indicative of prostate wash-out behavior and a color intensity indicative of prostate wash-in behavior.

32. The image of claim 31 as a display on a monitor.

33. The image of claim 31 digitally encoded on a computer readable medium.

34. The image of claim 31 printed on a printable medium.

35. The image of claim 31 wherein at least three colors are used.

36. The image of claim 35 wherein the colors include red, blue and green.

* * * * *